United States Patent
Furutani et al.

(10) Patent No.: US 7,904,031 B2
(45) Date of Patent: Mar. 8, 2011

(54) HIGH-FREQUENCY MODULE FOR TRANSMITTING AND RECEIVING TRANSMISSION-RECEPTION SIGNALS OF AT LEAST THREE COMMUNICATION SYSTEMS USING A SINGLE ANTENNA

(75) Inventors: Koji Furutani, Moriyama (JP); Shinya Watanabe, Yasu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 737 days.

(21) Appl. No.: 10/595,783

(22) PCT Filed: Nov. 1, 2004

(86) PCT No.: PCT/JP2004/016214
§ 371 (c)(1),
(2), (4) Date: Sep. 24, 2007

(87) PCT Pub. No.: WO2005/046071
PCT Pub. Date: May 19, 2005

(65) Prior Publication Data
US 2008/0318623 A1    Dec. 25, 2008

(30) Foreign Application Priority Data
Nov. 11, 2003    (JP) .................................. 2003-381088

(51) Int. Cl.
*H04B 1/44*    (2006.01)
(52) U.S. Cl. ............................... 455/83; 455/78; 370/339
(58) Field of Classification Search .................... 455/78, 455/79, 80, 81, 82, 83, 307; 370/339
See application file for complete search history.

(56) References Cited

U.S. PATENT DOCUMENTS

| | | |
|---|---|---|
| 5,815,804 A | 9/1998 | Newell et al. |
| 6,750,737 B2 | 6/2004 | Uriu et al. |
| 2004/0071111 A1 | 4/2004 | Satoh et al. |
| 2004/0095919 A1 | 5/2004 | Nitani et al. |
| 2004/0130388 A1 | 7/2004 | Block et al. |
| 2004/0266378 A1 | 12/2004 | Fukamachi et al. |

FOREIGN PATENT DOCUMENTS

| | | |
|---|---|---|
| DE | 101 02 201 A1 | 8/2002 |
| JP | 6-237101 A | 8/1994 |
| JP | 08-223021 A | 8/1996 |
| JP | 10-93471 A | 4/1998 |

(Continued)

OTHER PUBLICATIONS

Official Communication issued in corresponding European Patent Application No. 04799420.7, mailed on Jan. 20, 2010.

(Continued)

*Primary Examiner* — Blane J Jackson
(74) *Attorney, Agent, or Firm* — Keating & Bennett, LLP

(57) ABSTRACT

A high-frequency module includes a GaAs switch defining an FET switch for selectively connecting one of four RF input-output terminals to an antenna input-output terminal to be connected to an antenna. A GSM transmission signal input terminal is connected to the RF input-output terminal of the GaAsSW through a low-pass filter, and a DCS/PCS transmission signal input terminal is connected to the RF input-output terminal through a low-pass filter. A GSM 850 reception signal output terminal and a PCS reception signal output terminal are connected to the RF input-output terminal through a diplexer, and a GSM 900 reception signal output terminal and a PCS reception signal output terminal are connected to the RF input-output terminal through a diplexer.

20 Claims, 12 Drawing Sheets

FOREIGN PATENT DOCUMENTS

| | | |
|---|---|---|
| JP | 2000-165288 A | 6/2000 |
| JP | 2000-278168 A | 10/2000 |
| JP | 2000-295001 A | 10/2000 |
| JP | 2001-127665 A | 5/2001 |
| JP | 2001-160724 A | 6/2001 |
| JP | 2001-185902 A | 7/2001 |
| JP | 2001-211097 A | 8/2001 |
| JP | 2001-267957 A | 9/2001 |
| JP | 2001-285112 A | 10/2001 |
| JP | 2001-285122 A | 10/2001 |
| JP | 2002-185356 A | 6/2002 |
| JP | 2002-271104 A | 9/2002 |
| JP | 2002-290269 A | 10/2002 |
| JP | 2002-300070 A | 10/2002 |
| JP | 2002-353851 A | 12/2002 |
| JP | 2003-023370 A | 1/2003 |
| JP | 2003-133989 A | 5/2003 |
| JP | 2003-152588 A | 5/2003 |
| JP | 2003-163606 A | 6/2003 |
| JP | 2003-273687 A | 9/2003 |
| JP | 2004-228666 A | 8/2004 |
| WO | 03/036806 A1 | 5/2003 |

OTHER PUBLICATIONS

Official communication issued in counterpart Chinese Application No. 200400318150, mailed on Dec. 5, 2008.
Official communication issued in counterpart Japanese Application No. 2005-515284, mailed on Dec. 11, 2007.
Official communication issued in counterpart Japanese Application No. 2005-515284, mailed on Mar. 11, 2008.
International Search Report issued in the corresponding International Application No. PCT/JP2004/016214, mailed on Feb. 15, 2005.
Official Communication issued in European Patent Application No. 04 799 420.7, mailed on Jun. 18, 2009.
Official Communication issued in corresponding European Patent Application No. 04799420.7, mailed on Jul. 15, 2010.
Official communication issued in counterpart European Application No. 04799420.7, mailed on Mar. 2, 2009.
Official Communication issued in corresponding Japanese Patent Application No. 2008-197562, mailed on Nov. 9, 2010.

HIGH-FREQUENCY MODULE FOR TRANSMITTING AND RECEIVING TRANSMISSION-RECEPTION SIGNALS OF AT LEAST THREE COMMUNICATION SYSTEMS USING A SINGLE ANTENNA

BACKGROUND OF THE INVENTION

1. Field of the Invention

The present invention relates to a high-frequency module for transmitting and receiving transmission-reception signals of at least three communication systems, each having a different frequency band from each other as a transmission-reception band, by using a single antenna.

2. Description of the Related Art

At present, there is a plurality of specifications of a CDMA method, a TDMA method, etc., in radio communication methods of portable telephones, etc. In the TDMA method, there are GSM using an 850 MHz band and a 900 MHz band, DCS using a 1,800 MHz band, and PCS using a 1,900 MHz band, for example. In the CDMA method, there is WCDMA using a 2,000 MHz band, for example.

When a plurality of kinds of communication signals like this is transmitted and received by using one antenna, other signals than a frequency band in which communications actually take place become unnecessary. For example, when transmission and reception by the GSM method (900 MHz band) is performed, communication signals of the DCS method (1,800 MHz band) and PCS method (1,900 MHz band) and a communication signal of the WCDMA method (2,000 MHz band) become unnecessary.

As a high-frequency module for transmitting and receiving a plurality of kinds of communication signals by using a single antenna, a module where communication signals of three kinds of GSM, DCS, and PCS methods are used, for example, as described below. In the module, a diplexer for separating a GSM communication signal and a DCS/PCS communication signal having greatly different bands from each other, a diode switch circuit for switching a GSM transmission signal and a GSM reception signal, a diode switch circuit for switching a DCS/PCS transmission signal and a DCS/PCS reception signal, and a diode switch circuit for switching a DCS reception signal and a PCS reception signal are provided (see Japanese Unexamined Patent Application Publication No. 2000-165288, for example).

Furthermore, as a high-frequency module for transmitting and receiving a plurality of kinds of communication signals by busing a single antenna like this, a high-frequency module in which a plurality of ports can be connected to a port for an antenna by switching the plurality of ports, and in which each communication signal is selectively transmitted and received by using a semiconductor switch like a GaAs IC switch, for example, is proposed (Japanese Unexamined Patent Application Publication No. 2001-160724, for example).

However, the diode switch circuit of the high-frequency module in the above-described Japanese Unexamined Patent Application Publication No. 2000-165288 switches the connection of two ports (input-output portions) to one port (input-output portion) by using two diodes. For example, in an example in Japanese Unexamined Patent Application Publication No. 2000-165288, a first diode switch circuit (a high-frequency switch 3 in a drawing in Japanese Unexamined Patent Application Publication No. 2000-165288) switches the connection of a port for making connection to a DCS/PCS transmission signal input terminal and inputting a DCS/PCS transmission signal or a port for making connection to a second diode switch circuit (a high-frequency switch 4 in the drawing in Japanese Unexamined Patent Application Publication No. 2000-165288) and outputting a DCS/PCS reception signal to a port for making connection to a diplexer and inputting-outputting a DCS/PCS transmission-reception signal. Then, the second diode switch circuit switches the connection of a port for making connection to a PCS reception signal output terminal and outputting a PCS reception signal or a port for making connection to a DCS reception signal output terminal and outputting a DCS reception signal to a port for making connection to the first diode switch circuit and inputting the DCS/PCS reception signal. In this way, in the high-frequency module in Japanese Unexamined Patent Application Publication No. 2000-165288, since at least two diodes are required to switch the connection of two ports to one port, many circuit elements are required to constitute a high-frequency module for switching transmission and reception of communication signals in a plurality of communication systems. Accordingly, it becomes hard to make the high-frequency module smaller and the cost increases because of the increase in the number of circuit elements required. Furthermore, since many circuit elements are connected in a transmission system, the loss of a signal to be transmitted increases and communication characteristics are worsened.

Furthermore, in the first diode switch circuit, when a PCS transmission signal is transmitted, the port for inputting a DCS/PCS transmission signal and the port for outputting a DCS/PCS reception signal are not sufficiently isolated from each other and, as a result, a PCS transmission signal is inputted to the second diode switch circuit through the port for outputting a DCS/PCS reception signal. Since a PCS transmission signal partially agrees in frequency band with a DCS reception signal, the PCS transmission signal inputted to the second diode switch circuit is transmitted to the DCS reception signal output terminal and also transmitted to a SAW filter connected to the DCS reception signal output terminal and a functional circuit at a later stage. Since the transmission signal has a large output, when a PCS transmission signal is transmitted to the DCS reception signal output terminal in this manner, there is a possibility in that the SAW filter and functional circuit element at a later stage are destroyed.

On the other hand, in the high-frequency module in Japanese Unexamined Patent Application Publication No. 2001-160724, since signals of communication systems of many kinds can be switched by one GaAs IC switch, reduction in size and loss of a high-frequency module can be realized. However, the GaAs IC switch is expensive, and the more the switching number increases, the much more expensive the GaAs IC switch becomes.

SUMMARY OF THE INVENTION

In order to overcome the problems described above, preferred embodiments of the present invention provide a relatively small and less expensive high-frequency module in which the isolation between transmission-reception signals in a plurality of communication systems, three or more systems, for example, is sufficiently secured and each transmission-reception signal is securely transmitted and received.

A preferred embodiment of the present invention provides a high-frequency module for transmitting and receiving transmission-reception signals of communication systems of at least three kinds from an antenna, the signals to be inputted and outputted from particular input-output portions, respectively. The high-frequency module according to this preferred embodiment of the present invention includes an FET switch including an antenna input-output portion to be connected to the antenna and at least three signal input-output portions whose connection to the antenna input-output portion is switched in accordance with control signals to be inputted, the FET being constituted such that the transmission signals of communication systems of at least three kinds are inputted from different signal input-output portions and such that reception signals of at least two communication systems are outputted from the same signal input-output portion, and a diplexer connected to the signal input-output portion, from which reception signals of at least two communication systems are outputted, of the FET switch and for separating the reception signals of two communication systems.

More specifically, in a preferred embodiment of the present invention, the high-frequency module is a high-frequency module for transmitting and receiving transmission-reception signals of first, second, third, and fourth communication systems from an antenna, and the FET switch includes first, second, third, and fourth signal input-output potions and is constituted such that transmission signals of the first communication system and the second communication system are inputted to the first signal input-output portion, such that transmission signals of the third communication system and the fourth communication system are inputted to the second signal input-output portion, such that reception signals of the first communication system and the fourth communication system are outputted from the third signal input-output portion, and such that reception signals of the second communication system and the third communication system are outputted from the fourth signal input-output portion. Furthermore, in a high-frequency module according to a preferred embodiment of the present invention, a first diplexer connected to the third signal input-output portion and for separating a reception signal of the first communication system and a reception signal of the fourth communication system and a second diplexer connected to the fourth signal input-output portion and for separating a reception signal of the second communication system and a reception signal of the third communication system are provided.

Furthermore, in a preferred embodiment of the present invention, the high-frequency module is a high-frequency module for transmitting and receiving transmission-reception signals of first, second, third, and fourth communication systems from an antenna, and the FET switch includes first, second, third, and fourth signal input-output portions and is constituted such that a transmission signal of the first communication system and a reception signal of the second communication system are inputted to the first signal input-output portion, such that transmission signals of the second communication system and the third communication system are inputted to the second signal input-output portion, such that a reception signal of the third communication system is outputted from the third signal input-output portion, and such that a reception signal of the first communication system and a transmission-reception signal of the fourth communication system are inputted to and outputted from the fourth signal input-output portion. Furthermore, in a high-frequency module of a preferred embodiment of the present invention, a first diplexer connected to the first signal input-output portion and for separating a transmission signal of the first communication system and a reception signal of the second communication system and a second diplexer connected to the fourth signal input-output portion and for separating a reception signal of the first communication system and a transmission-reception signal of the fourth communication system are provided.

Furthermore, in a preferred embodiment of the present invention, the high-frequency module is a high-frequency module for transmitting and receiving transmission-reception signals of first, second, and third communication systems from an antenna, and the FET switch includes first, second, third, and fourth signal input-output portions and is constituted such that a transmission signal of the first communication system is inputted to the first signal input-output portion, such that transmission signals of the second communication system and the third communication system are inputted to the second signal input-output portion, such that a reception signal of the third communication system is outputted from the third signal input-output portion, and such that a reception signal of the first communication system and a reception signal of the second communication system are outputted from the fourth signal input-output portion. Furthermore, in a high-frequency module of a preferred embodiment of the present invention, a diplexer connected to the fourth signal input-output portion and for separating a reception signal of the first communication system and a reception signal of the second communication system is provided.

In each structure described above, the connection of a transmission signal input portion, reception signal output portion, and transmission-reception signal input-output portion to an antenna input-output portion in a high-frequency module corresponding to each communication system can be switched by an FET switch. Accordingly, the isolation between the transmission signal input portions, reception signal output portions, and transmission-reception signal input-output portions connected to different signal input-output portions of the FET switch can be secured. Furthermore, a diplexer for separating reception signals of different communication systems is connected to a particular signal input-output portion of the FET, and reception signal output portions of reception signals of two communication systems having different frequency bands for use (the frequency bands for use are greatly different from each other as the frequency bands for use are different in unit, in particular) are connected to the diplexer. Accordingly, even if one signal input-output portion of the FET switch is shared by two communication systems, since reception signals of these communication systems are separated by the diplexer, the isolation between the reception signal output portions connected to the diplexer is secured.

Moreover, since the FET switch is constituted such that transmission signals of communication systems of at least three kinds are inputted from different signal input-output portions, that is, since the FET switch is constituted such that transmission signals of communication systems of two kinds are not inputted to a certain one signal input-output portion, the transmission signals do not pass through both a low-pass filter and a high-pass filter in their signal passes and the signal loss can be minimized.

Furthermore, since the FET switch switches the connection of an antenna input-output portion to a plurality of the other signal input-output portions, when the FET switch and a diplexer are used, the number of circuit elements can be minimized in comparison with the case where a diplexer and a diode switch circuit are used.

Furthermore, since reception signals of two communication systems are separated by using a diplexer, two communication signals are allotted to one signal input-output terminal of the FET switch, the number of signal input-output portions of the FET switch can be made smaller than the number of transmission-reception signals of communication systems in use, and, even if the number of transmission-reception signals of communication systems in use increases, the increase of the number of signal input-output portions of the FET switch can be prevented. Moreover, since reception signals of two different communication systems can be received at the same time without fail, neither of the reception signals is lost.

Furthermore, according to another preferred embodiment of the present invention, the FET switch is preferably an FET switch using GaAs.

Furthermore, according to another preferred embodiment of the present invention, the high-frequency module includes a laminate having dielectric layers laminated therein, and each circuit element constituting the diplexer is defined by an electrode pattern disposed on the surface of the dielectric layer.

In such a structure, since the diplexer is located inside a laminate constituting the high-frequency module, the high-frequency module can be reduced in size.

Furthermore, in a preferred embodiment of the present invention, on the uppermost surface of the laminate, a plurality of lands for mounting an antenna input-output portion and each signal input-output portion of the FET switch are provided and a grounding electrode is located substantially in the center where the plurality of lands are disposed.

In such a structure, since a grounding electrode is located substantially in the center where a plurality of lands for the FET switch disposed on the uppermost surface of the laminate are provided, the isolation between lands is improved.

Furthermore, according to a preferred embodiment of the present invention, on the lowermost surface of the laminate, a plurality of electrodes for mounting the laminate on a mounting substrate is provided, and an electrode of the input-output portion for inputting a transmission signal and an electrode of the antenna input-output portion in the plurality of electrodes are disposed along different sides of the laminate.

In such a structure, since an electrode of the transmission signal input portion and an electrode of the antenna input-output portion are separated from each other, the isolation between the electrodes is secured and the direct transmission of a transmission signal to the antenna from the transmission signal input portion of the high-frequency module is reliably prevented.

According to a preferred embodiment of the present invention, the isolation between input-output portions is secured and a high-frequency module having excellent transmission-reception characteristics can be constituted in such a way that an FET switch is connected to an antenna, a portion of input-output portions of signals of each communication system and a diplexer are connected to the FET switch, and the rest of the input-output portions is connected to the diplexer. Furthermore, when the FET switch and the diplexer are used, since the number of parts is reduced in comparison with the case where a diode switch circuit and a diplexer are used and the cost of parts is lowered in comparison with the case where only an FET switch is used, a high-frequency module of small size and at low loss can be constituted at low cost.

Furthermore, according to a preferred embodiment of the present invention, when a diplexer is disposed inside a laminate, a high-frequency module having a much smaller size can be provided.

Furthermore, according to a preferred embodiment of the present invention, when a grounding electrode is disposed substantially in the center of a group of lands on the uppermost surface of a laminate, the isolation between input-output portions is further improved and a high-frequency module having more excellent transmission-reception characteristics can be constituted.

Furthermore, according to a preferred embodiment of the present invention, since an electrode of the antenna input-output portion and an electrode of the transmission signal input portion are separated form each other, the isolation between the electrodes is secured and the direct transmission of a transmission signal to the antenna from the transmission signal input portion of the high-frequency module is reliably prevented.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

A high-frequency module according to a first preferred embodiment of the present invention is described with reference to FIGS. 1 to 4.

Figure 1:
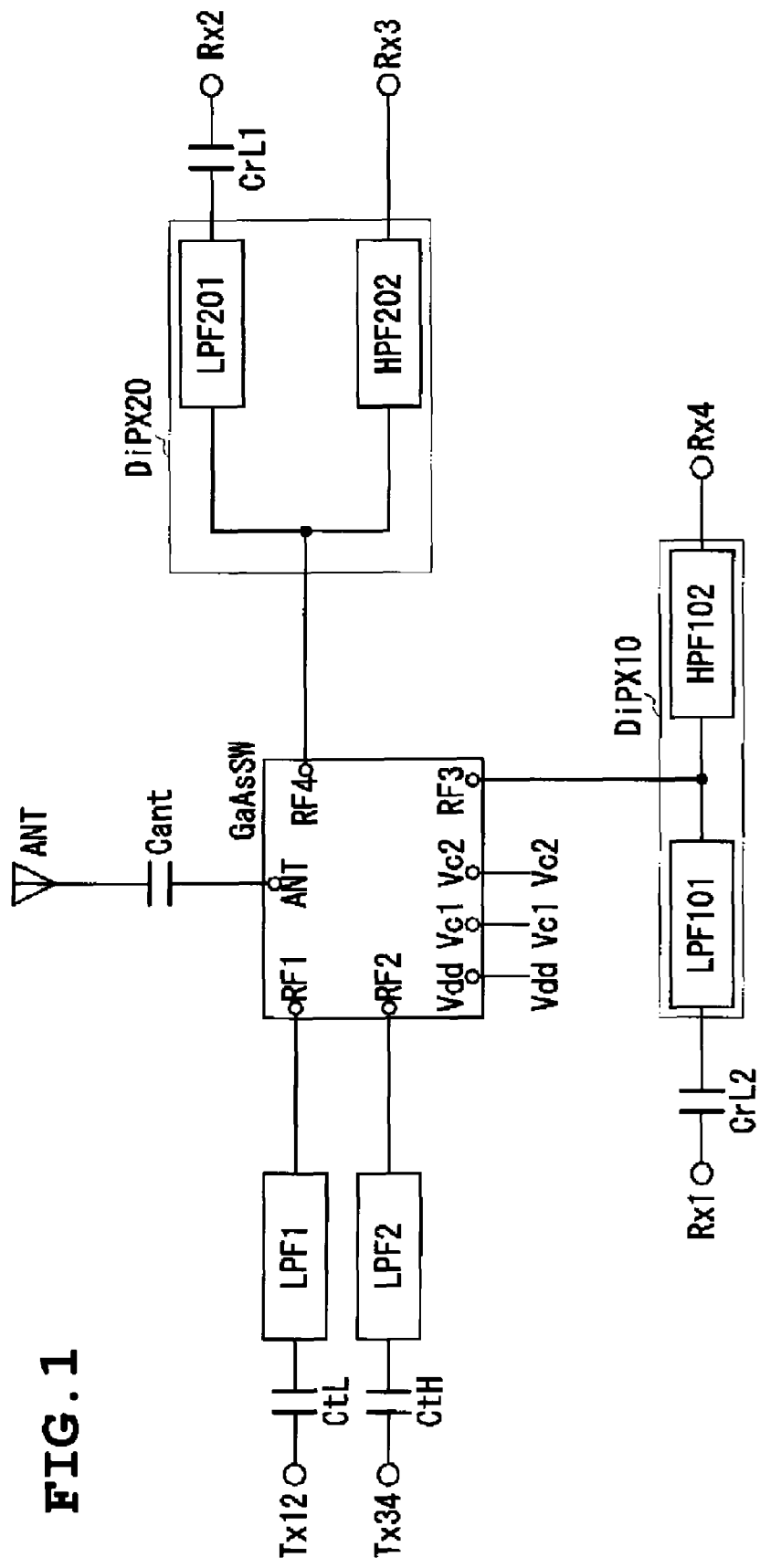
FIG. 1 is a block diagram of a high-frequency module according to a first preferred embodiment of the present invention.
Figure 2:
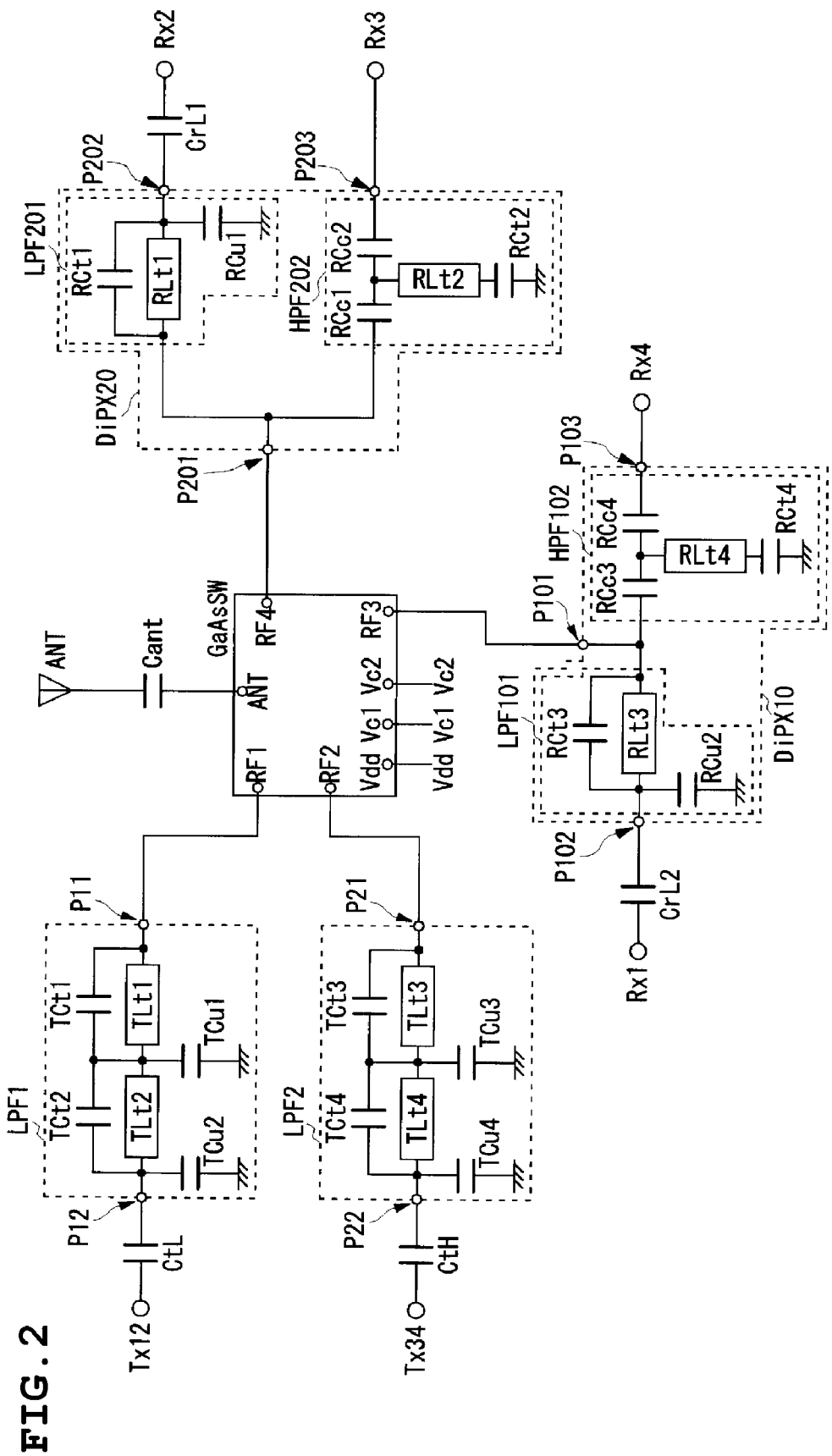
FIG. 2 is an equivalent circuit diagram of the high-frequency module according to a first preferred embodiment of the present invention.

FIG. 1 is a block diagram showing the structure of the high-frequency module according to the present preferred embodiment and FIG. 2 is an equivalent circuit diagram showing the structure of the high-frequency module according to the present preferred embodiment.

Moreover, in the present preferred embodiment, a transmission signal of GSM 850 MHz (hereinafter referred to as a "GSM 850 MHz transmission signal") or a transmission signal of GSM 900 MHz (hereinafter referred to as a "GSM 900 MHz transmission signal") is inputted from a transmission signal input terminal Tx12, a reception signal of GSM 850 MHz (hereinafter referred to as a "GSM 850 MHz reception signal") is outputted from a reception signal output terminal Rx1, and a reception signal of GSM 900 MHz (hereinafter referred to as a "GSM 900 MHz reception signal") is outputted from a reception signal output terminal Rx2. Furthermore, a DCS transmission signal or a PCS transmission signal is inputted from a transmission input terminal Tx34, a DCS reception signal is outputted from a reception signal output terminal Rx3, and a PCS reception signal is outputted from a reception signal output terminal Rx4. Each of these transmission signal input terminals and reception signal output terminals corresponds to an "input-output portion" of various preferred embodiments of the present invention.

In a GaAs switch GaSaSW (hereinafter simply referred to as a "GaAsSW"), an antenna input-output terminal ANT connected to an antenna ANT through a capacitor Cant, RF input-output terminals RF1 to RF4 (hereinafter simply referred to as a "RF1 terminal, RF2 terminal, RF3 terminal, and RF4 terminal", respectively) for inputting and outputting one of transmission-reception signals of GSM/DCS/PCS communication systems, a drive voltage input terminal Vdd, and control signal input terminals Vc1 and Vc2 are provided. While a drive voltage Vdd is applied, the GaAsSW is switched in such a way that the antenna input-output terminal ANT is connected to one of the RF1 terminal to RF4 terminal depending on the combination of ON/OFF of two control signals Vc1 and Vc2. The GaAsSW is mounted on the upper surface of a laminate constituting the high-frequency module. The GaAsSW corresponds to an "FET switch" of various preferred embodiments of the present invention, the antenna input-output terminal ANT corresponds to an "antenna input-output portion" of various preferred embodiments of the present invention, the RF1 terminal to RF4 terminal corresponds to "signal input-output portions" of various preferred embodiments of the present invention, and the RF4 terminal correspond to "signal input-output portions where transmission signals or reception signals of at least two communication systems are inputted and outputted" of various preferred embodiments of the present invention.

One terminal of a low-pass filter LPF1 is connected to the RF1 terminal of the GaAsSW and the GSM 850/GSM 900 transmission signal input terminal Tx12 is connected to the other terminal of the low-pass filter LPF1 through a capacitor CtL.

One terminal of a low-pass filter LPF2 is connected to the RF2 terminal of the GaAsSW and the DCS/PCS transmission signal input terminal Tx34 is connected to the other terminal of the low-pass filter LPF2 through a capacitor CtH.

A diplexer DiPX10 including a low-pass filter LPF101 and a high-pass filter 102 is connected to the RF3 terminal of the GaAsSW at the connection point between the low-pass filter LPF101 and the high-pass filter 102. Then, the GSM 850 reception signal output terminal Rx1 is connected to a terminal portion, opposite to the connection point, of the low-pass filter LPF101 of the diplexer DiPX10 through a capacitor CrL2, and the PCS reception signal output terminal Rx4 is connected to a terminal portion, opposite to the connection point, of the high-pass filter HPF102 of the diplexer DiPX10.

A diplexer DiPX20 including a low-pass filter LPF201 and a high-pass filter HPF202 is connected to the RF4 terminal of the GaAsSW at the connection point between the low-pass filter LPF201 and the high-pass filter HPF202. Then, the GSM 900 reception signal output terminal Rx2 is connected to a terminal portion, opposite to the connection point, of the low-pass filter LPF201 of the diplexer DiPX20 through a capacitor CrL1, and the DCS reception signal output terminal Rx3 is connected to a terminal portion, opposite to the connection point of the high-pass filter HPF202, of the diplexer DiPX20.

Next, the specific circuit structure is described with reference to FIG. 2.

Input-output portions P11 and P12 are provided in the low-pass filter LPF1, the input-output portion P11 is connected to the RF1 terminal of the GaAsSW, and the input-output terminal P12 is connected to the GSM 850/900 transmission signal input terminal Tx12 through the capacitor CtL. A parallel circuit of a capacitor TCt1 and an inductor TLt1 and a parallel circuit of a capacitor TCt2 and an inductor TLt2 are connected in series between the input-output portion P11 and the input-output portion P12. A capacitor TCu1 is connected between the connection point of the two parallel circuits and the ground, and a capacitor TCu2 is connected between the side of the input-output portion P12 of the inductor TLt2 and the ground.

Input-output portions P21 and P22 are included in the low-pass filter LPF2, the input-output portion P21 is connected to the RF2 terminal of the GaAsSW, and the input-output terminal P22 is connected to the DCS/PCS transmission signal input terminal Tx34 through the capacitor CtH. A parallel circuit of a capacitor TCt3 and an inductor TLt3 and a parallel circuit of a capacitor TCt4 and an inductor TLt4 are connected in series between the input-output portion P21 and the input-output portion P22. A capacitor TCu3 is connected between the connection point of the two parallel circuits and the ground, and a capacitor TCu4 is connected between the side of the input-output portion P22 of the inductor TLt4 and the ground.

Three input-output portions P101 to P103 are provided in the diplexer DiPX10. The input-output portion P101 connected to the RF3 terminal of the GaAsSW is connected to the input-output portion P102 on the side of the GSM 850 reception signal output portion Rx1 through the low-pass filter LPF101 and simultaneously connected to the input-output portion P103 on the side of the PCS reception signal output terminal Rx4 through the high-pass filter HPF102. Here, the low-pass filter LPF101 is set so as to attenuate a signal on the higher-frequency side than the frequency band of a GSM 850 reception signal, and the high-pass filter HPF102 is set to attenuate a signal on the lower-frequency side than the frequency band of a PCS reception signal.

The low-pass filter LPF101 preferably includes a parallel circuit of a capacitor RCt3 and an inductor RLt3 between the input-output portion P101 and the input-output portion P102 and a capacitor RCu2 connected between the side of the input-output portion P102 and the ground. Furthermore, the high-pass filter HPF102 of the parallel circuit includes capacitors RCc3 and RCc4 connected in series between the input-output portion P101 and the input-output portion P103 and a series circuit of an inductor RLt4 and a capacitor RCt4 connected between the connection point of the capacitors RCc3 and RCc4 and the ground.

The diplexer DiPX20 includes three input-output portions P201 to P203. The input-output portion P201 connected to the RF4 terminal of the GaAsSW is connected to the input-output portion P202 on the side of the GSM 900 reception signal output portion Rx2 through the low-pass filter LPF201 and simultaneously connected to the input-output portion P203 on the side of the DCS reception signal output terminal Rx3 through the high-pas filter HPF202. Here, the low-pass filter LPF201 is set so as to attenuate a signal on the higher-frequency side as compared to the frequency band of a GSM 900 reception signal, and the high-pass filter HPF202 is set to attenuate a signal on the lower-frequency side as compared to the frequency band of a DCS reception signal.

The low-pass filter LPF201 preferably includes a parallel circuit of a capacitor RCt1 and an inductor RLt1 connected between the input-output portion P201 and the input-output portion 202 and a capacitor RCu1 connected between the side of the input-output portion P102 of the parallel circuit and the ground. Furthermore, the high-pass filter HPF202 includes capacitors RCc1 and RCc2 connected in series between the input-output portion P201 and the input-output portion P203 and a series circuit of an inductor RLt2 and a capacitor RCt2 connected between the connection point of the capacitors RCc1 and RCc2 and the ground.

As will be described later, the circuit elements constituting the above-described low-pass filters LPF1 and LPF2 and the diplexers DiPX10 and DiPX20 are preferably defined by an electrode pattern of each dielectric layer of a laminate constituting the high-frequency module.

Next, the transmission-reception operation of a GSM 850/GSM 900/DCS/PCS communication signal of the high-frequency module is described.

1) Transmission Operation of a GSM 850/GSM 900 Transmission signal

When a GSM 850 transmission signal and GSM 900 transmission signal (hereinafter generally referred to as a "GSM transmission signal") are transmitted, control signals for connecting the antenna input-output terminal ANT and the RF1 terminal are inputted to the control signal input terminals Vc1 and Vc2 of the GaAsSW. When the control signals of this combination are inputted (for example, the control signals of positive voltage are inputted to Vc1 and Vc2), the RF1 terminal and the antenna input-output terminal ANT of the GaAsSW are made conductive to each other. At this point, when a GSM transmission signal is inputted from the GSM 850/GSM 900 transmission signal input terminal Tx12, the GSM transmission signal is inputted to the RF1 terminal through the low-pass filter LPF1 and transmitted from the RF1 terminal to the antenna input-output terminal ANT. The GSM transmission signal is outputted from the antenna input-output terminal ANT to the antenna ANT and transmitted from the antenna ANT to the outside. Here, in the GaAsSW, since the antenna input-output terminal ANT and the RF1 terminal are made conductive to each other and the other RF2 terminal to RF4 terminal are made open, the GSM transmission signal is not transmitted to the other RF2 terminal to RF4 terminal. Thus, the GSM transmission signal is not transmitted to the DCS/PCS transmission signal input terminal Tx34, GSM 850 reception signal input terminal Rx1, GSM 900 reception signal output terminal Rx2, DCS reception signal output terminal Rx3, and PCS reception signal output terminal Rx4.

2) Transmission Operation of a DCS/PCS Transmission Signal

When a DCS transmission signal or PCS transmission signal (hereinafter generally referred to as a "DCS/PCS transmission signal") is transmitted, control signals for connecting the antenna input-output terminal ANT and the RF2 terminal are inputted to the control signal input terminals Vc1 and Vc2 of the GaAsSW. When the control signals for the combination are inputted (for example, the control signal of positive voltage is inputted to Vc1 and the control signal of zero voltage or negative voltage is inputted to Vc2), the RF2 terminal and the antenna input-output terminal ANT of the GaAsSW are made conductive to each other. At this point, when a DCS/PCS transmission signal is inputted from the DCS/PCS transmission signal input terminal Tx34, the DCS/PCS transmission signal is inputted to the RF2 terminal through the low-pass filter LPF2 and transmitted from the FR2 terminal to the antenna input-output terminal ANT. The DCS/PCS transmission signal is outputted from the antenna input-output terminal ANT to the antenna ANT and transmitted from the antenna to the outside. Here, in the GaAsSW, since the antenna input-output terminal ANT and the RF2 terminal are made conductive to each other and the other RF1 terminal, RF3 terminal, and RF4 terminal are made open, the DCS/PCS transmission signal is not transmitted to the other RF1 terminal, RF3 terminal, and RF4 terminal. Thus, the DCS/PCS transmission signal is not transmitted to the GSM transmission signal input terminal Tx12, GSM 850 reception signal output terminal Rx1, GSM 900 reception signal output terminal Rx2, DCS reception signal output terminal Rx3, and PCS reception signal output terminal Rx4.

3) Transmission Operation of a GSM 850 Reception Signal

When a GSM 850 reception signal is transmitted, control signals for connecting the antenna input-output terminal ANT and the RF3 terminal are inputted to the control signal input terminals Vc1 and Vc2 of the GaAsSW. When the control signals of the combination are inputted (for example, the control signal of zero voltage or negative voltage is inputted to Vc1 and the control signal of positive voltage is inputted to Vc2), the antenna input-output terminal ANT and the RF terminal RF3 of the GaAsSW are made conductive to each other. At this point, when the 850 reception signal is inputted from the antenna input-output terminal ANT, the GSM 850 reception signal is transmitted from the antenna input-output terminal ANT to the RF3 terminal. Here, in the GaAsSW, since the antenna input-output terminal ANT and the RF3 terminal are made conductive to each other and the other RF1 terminal, RF2 terminal, and RF4 terminal are made open, the GSM reception signal is not transmitted to the other RF1 terminal, RF2 terminal, and RF4 terminal. Thus, the GSM 850 reception signal is not transmitted to the GSM transmission signal input terminal Tx12, DCS/PCS transmission signal input terminal Tx34, GSM 900 reception signal output terminal Rx2, and DCS reception signal output terminal Rx3.

The GSM 850 reception signal outputted from the RF3 terminal is inputted from the input-output portion P101 of the diplexer DiPX10, passes through the low-pas filter LPF101 of the diplexer DiPX10 and is outputted to the input-output portion P102, and is transmitted to the GSM 850 reception signal output terminal Rx1 through the capacitor CrL2. Here, as described above, since the high-pass filter HPF102 attenuates the lower-frequency side than the frequency band of a PCS reception signal, the GSM 850 reception signal is attenuated by the high-pass filter HPF102 and not transmitted to the PCS reception signal output terminal Rx4.

4) Transmission Operation of a GSM 900 Reception Signal

When a GSM 900 reception signal is transmitted, control signals for connecting the antenna input-output terminal ANT and the RF4 terminal are inputted to the control signal input terminals Vc1 and Vc2 of the GaAsSW. When the control signals of the combination are inputted (for example, the control signals of zero voltage or negative voltage are inputted to Vc1 and Vc2), the antenna input-output terminal ANT and the RF4 terminal of the GaAsSw are made conductive to each other. At this point, when the GSM 900 reception signal is inputted from the antenna input-output terminal ANT, the GSM 900 reception signal is transmitted from the antenna input-output terminal ANT to the RF4 terminal. Here, in the GaAsSW, since the antenna input-output terminal ANT and the RF4 terminal are made conductive to each other and the other RF1 terminal to RF3 terminal are made open, the GSM 900 reception signal is not transmitted to the other RF1 terminal to RF3 terminal. Thus, the GSM 900 reception signal is not transmitted to the GSM transmission signal input terminal Tx12, DCS/PCS transmission signal input terminal Tx34, GSM 850 transmission signal output terminal Rx1, and PCS reception signal output terminal Rx4.

The GSM 900 reception signal outputted from the RF4 terminal is inputted from the input-output portion P201 of the diplexer DiPX20, passes through the low-pas filter LPF201 of the diplexer DiPX20 and is outputted to the input-output portion P202, and is transmitted to the GSM 900 reception signal output terminal Rx2 through the capacitor CrL1. Here, as described above, since the high-pass filter HPF202 attenuates the lower-frequency side than the frequency band of a DCS reception signal, the GSM 900 reception signal is attenuated by the high-pass filter HPF202 and not transmitted to the DCS reception signal output terminal Rx3.

5) Transmission Operation of a DCS Reception Signal

When a DCS reception signal is transmitted, control signals for connecting the antenna input-output terminal ANT and the RF4 terminal are inputted to the control signal input terminals Vc1 and Vc2 of the GaAsSW. When the control signals of the combination are inputted (for example, the control signals of zero voltage or negative voltage are inputted to Vc1 and Vc2), the antenna input-output terminal ANT and the RF4 terminal of the GaAsSw are made conductive to each other. At this point, when the DCS reception signal is inputted from the antenna input-output terminal ANT, the DCS reception signal is transmitted from the antenna input-output terminal ANT to the RF4 terminal. Here, in the GaAsSW, since the antenna input-output terminal ANT and the RF4 terminal are made conductive to each other and the other RF1 terminal to RF3 terminal are made open, the DCS reception signal is not transmitted to the other RF1 terminal to RF3 terminal. Thus, the DCS reception signal is not transmitted to the GSM transmission signal input terminal Tx12, DCS/PCS transmission signal input terminal Tx34, GSM 850 transmission signal output terminal Rx2, and PCS reception signal output terminal Rx4.

The DCS reception signal outputted from the RF4 terminal is inputted to the input-output portion P201 of the diplexer DiPX20, passes through the high-pass filter HPF202 of the diplexer DiPX20 and is outputted to the input-output portion P203, and is transmitted to the DCS reception signal output terminal Rx3. Here, as described above, since the low-pass filter LPF201 attenuates the higher-frequency side than the frequency band of a GSM 900 reception signal, the DCS reception signal is attenuated by the low-pass filter LPF201 and not transmitted to the GSM 900 reception signal output terminal Rx2.

6) Transmission Operation of a PCS Reception Signal

When a PCS reception signal is transmitted, control signals for connecting the antenna input-output terminal ANT and the RF3 terminal are inputted to the control signal input terminals Vc1 and Vc2 of the GaAsSW. When the control signals of the combination are inputted (for example, the control signal of zero voltage or negative voltage is inputted to Vc1 and the control signal of positive voltage is inputted to Vc2), the antenna input-output terminal ANT and the RF3 terminal of the GaAsSw are made conductive to each other. At this point, when the PCS reception signal is inputted from the antenna input-output terminal ANT, the PCS reception signal is transmitted from the antenna input-output terminal ANT to the RF3 terminal. Here, in the GaAsSW, since the antenna input-output terminal ANT and the RF3 terminal are made conductive to each other and the other RF1 terminal, RF2 terminal, and RF4 terminal are made open, the PCS reception signal is not transmitted to the other RF1 terminal, RF2 terminal, and RF4 terminal. Thus, the PCS reception signal is not transmitted to the GSM transmission signal input terminal Tx12, DCS/PCS transmission signal input terminal Tx34, GSM 900 transmission signal output terminal Rx2, and DCS reception signal output terminal Rx4.

The PCS reception signal outputted from the RF3 terminal is inputted to the input-output portion P101 of the diplexer DiPX10, passes through the high-pass filter HPF102 of the diplexer DiPX10 and is outputted to the input-output portion P103, and is transmitted to the PCS reception signal output terminal Rx4. Here, as described above, since the low-pass filter LPF101 attenuates the higher-frequency side as compared to the frequency band of a GSM 850 reception signal, the PCS reception signal is attenuated by the low-pass filter LPF101 and not transmitted to the GSM 850 reception signal output terminal Rx1.

With this unique construction, a high-frequency module for transmitting and receiving GSM 850/GSM 900/DCS/PCS communication signals of four kinds through one antenna can be reliably provided.

Then, since transmission signals of at least two communication systems are inputted through different signal input-output portions (for example, the relation between a GSM transmission signal and a DCS transmission signal and the relation between a GSM 900 transmission signal and a PCS transmission signal), the isolation between both communication systems is secured and the harmonic wave distortion is prevented and minimized.

Furthermore, when the transmission signals or reception signals of two different communication systems are inputted and outputted through the RF terminals of the GaAsSW by using the diplexers in this way, the number of the RF terminals of the GaAsSW can be minimized in comparison with the case where all the transmission signals and reception signals are inputted and outputted through different RF terminals, respectively. Accordingly, since these transmission-reception signals can be individually transmitted by using the GaAsSW in which the number of RF terminals is smaller than the number of all transmission-reception signals of the communication systems being used, a less expensive GaAsSW in which the number of branches is small can be used, and a less expensive high-frequency module can be provided.

Furthermore, when a GaAsSW for selectively connecting a particular terminal (antenna input-output terminal ANT in this example) to a plurality of the other terminals (RF terminals RF1 to RF4 in the case of this example) is preferably used, in comparison with the case where a diode switch circuit is used, the number of constituting elements of a high-frequency module can be reduced and a small-sized and low-loss high-frequency module can be provided at relatively low cost.

Next, the structure of a laminate of the high-frequency module is described with reference to FIGS. 3 and 4.

Figure 3:
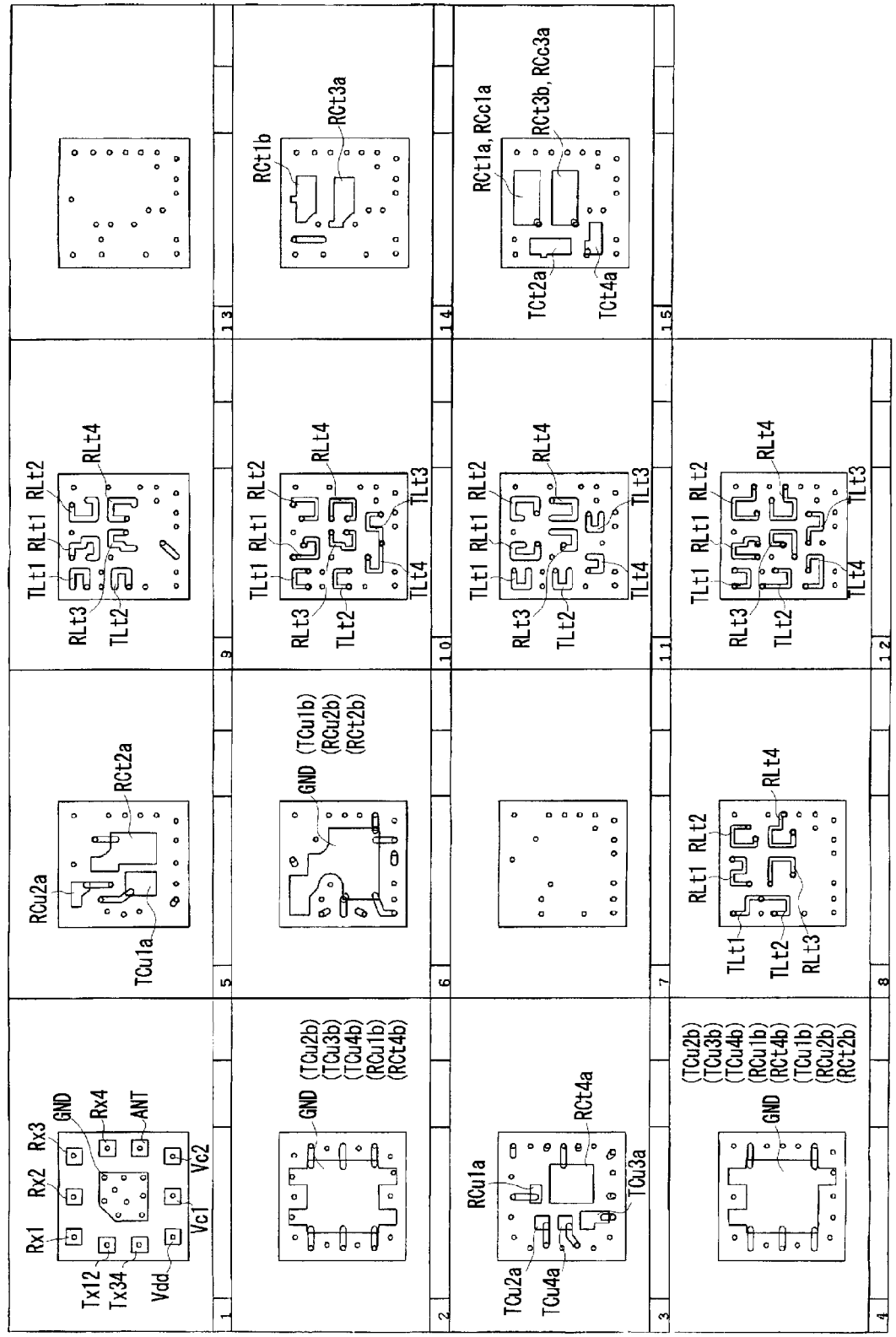
FIG. 3 is a lamination drawing of the high-frequency module shown in FIGS. 1 and 2.
Figure 4:
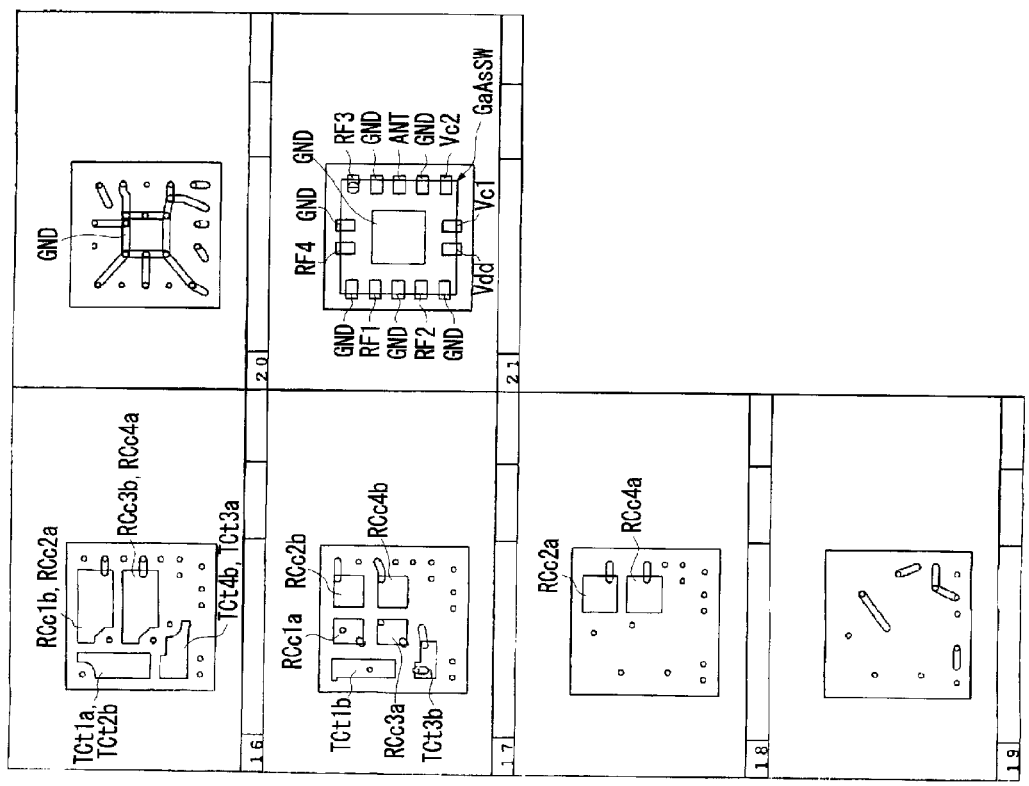
FIG. 4 is another lamination drawing of the high-frequency module shown in FIGS. 1 and 2.

FIGS. 3 and 4 are lamination drawings of the high-frequency module according to another preferred embodiment of the present invention.

In the laminate-type high-frequency module of the present preferred embodiment, each of dielectric layers 1 to 20 shown in FIGS. 3 and 4 are laminated from the bottom in order. However, each drawing in FIGS. 3 and 4 shows the state when seen from the lower side (side facing a mounting substrate). Then, what is shown as a dielectric layer 21 is the bottom surface of the dielectric layer 20 (upper surface of the laminate), that is, the electrodes and portions of the part mounting surface are shown. The symbols shown in FIGS. 3 and 4 correspond to the symbol of each element shown in FIGS. 1 and 2.

Various external terminal electrodes for mounting elements on the mounting substrate are disposed on the lower surface of the lowermost dielectric layer 1. That is, the GSM transmission signal input terminal Tx12, DCS/PCS transmission signal input terminal Tx34, GSM 850 reception signal output terminal Rx1, GSM 900 reception signal output terminal Rx2, DCS reception signal output terminal Rx3, PCS reception signal output terminal Rx4, control signal input terminals Vc1 and Vc2, drive voltage input terminal Vdd, ground (grounding) terminal GND, and antenna connection terminal ANT are provided. Here, the antenna connection terminal ANT is arranged so as to be spaced away from the GSM 850/900 transmission signal input terminal Tx12 and DCS/PCS transmission signal input terminal Tx34. For example, as shown in FIG. 3, when the transmission signal input terminals Tx12 and Tx34 are disposed along a side surface (left side surface when seen from the front of the drawing) of the laminate, the antenna connection terminal ANT is disposed along the side surface (right side surface when seen from the front of the drawing), opposite to the left side surface.

A common ground electrode GND is disposed in the dielectric layer 2 and the common ground electrode GND is also used as the opposite electrodes TCu2b, TCu3b, TCu4b, RCu1b, and RCt4b of the capacitors TCu2, TCu3, TCu4, and TCt4.

In the dielectric layer 3, the opposite electrodes TCu2a, TCu3a, TCu4a, RCu1a, and RCt4a of the capacitors TCu2, TCu3, TCu4, RCu1, and RCt4 are provided. In the dielectric layer 4, a common ground electrode GND is provided and this common ground is also used as the opposite electrodes TCu2b, TCu3b, TCu4b, RCu1b, RCt4b, TCu1b, RCu2b, and RCt2b of the capacitors TCu2, TCu3, TCu4, TCu1, RCt4, TCu1, RCu2, and RCt2.

In the dielectric layer 5, the opposite electrodes TCu1a, RCu2a, and RCt2a of the capacitors TCu1, RCu2, and RCt2 are provided.

In the dielectric layer 6, a common ground electrode GND is provided and this common ground GND is also used as the opposite electrodes TCu1b, RCu2b, and RCt2b of the capacitors TCu1, RCu2, and RCt2.

In the dielectric layer 7, only through-holes are formed.

In the dielectric layers 8 to 12, the inductors TLt1, TLt2, RLt1, RLt2, RLt3, and RLt4 are formed, and simultaneously, in the dielectric layers 10 to 12, the inductors TLt3 and TLt4 are formed.

In the dielectric layer 13, only through-holes are formed.

In the dielectric layer 14, the opposite electrodes RCt1b and RCt3a of the capacitors RCt1 and RCt3 are disposed.

In the dielectric layer 15, the opposite electrodes RCt1a, RCt3b, TCt2a, and TCt4a of the capacitors RCt1, RCt3, TCt2, and TCt4 are provided. Here, the opposite electrodes RCt1a and RCt3b are also used as the opposite electrodes RCc1a and RCc3a of the capacitors RCc1 and RCc3.

In the dielectric layer 16, the opposite electrodes TCt2b, TCt4b, RCc1b, and RCc3b of the capacitors TCt2, TCt4, RCc1, and RCc3 are provided and these opposite electrodes are also used as the opposite electrodes TCt1a, TCt3a, RCc2a, and RCc4a of the capacitors TCt1, TCt3, RCc2, and RCc4.

In the dielectric layer 17, the opposite electrodes TCt1b, TCt3b, RCc2b, RCc4b, RCc1a, and RCc3a of the capacitors TCt1, TCt3, RCc2, RCc4, RCc1, and RCc3 are provided.

In the dielectric layer 18, the opposite electrodes RCc2a and RCc4c of the capacitors RCc2 and RCc4 are provided.

In the dielectric layer 19, a wiring pattern is disposed, and, in the dielectric layer 20, a wiring pattern for making conductive between the grounding electrode and grounding terminal GND of the lower layer and each grounding electrode disposed on the back surface 21 of the dielectric layer 20 as the uppermost layer is provided.

On the back surface of the uppermost dielectric layer 20, that is, the upper surface 21 of the laminate, the lands for mounting the GaAsSW are arranged along the side walls of the laminate and, in the center of a group of the lands in such arrangement, a wider grounding electrode GND than the group of the other lands is arranged in a substantially square configuration. Here, regarding the arrangement of the group of the lands, the land GND for the grounding, the land RF1 for the RF1 terminal, the land GND for the grounding, the land RF2 for the RF2 terminal, and the land GND for the grounding are arranged along the left side of the dielectric layer 21 in FIG. 4 from the top in order when the drawing is seen as it is; the land Vdd for the drive voltage Vdd and the land Vc1 for the control signal Vc1 are arranged along the lower side from the left in order; the land Vc2 for the control signal Vc2, the land GND for the grounding, the land ANT for the antenna input-output terminal, the land GND for the grounding, and the land RF3 for the RF3 terminal are arranged along the right side from the bottom in order; and the land GND for the grounding and the land RF4 for the RF4 terminal are arranged along the upper side from the right in order. In this way, the GaAsSW is mounted on the lands having the unique arrangement described above.

When a land for the grounding is provided between the land for each RF terminal and the land for the antenna input-output terminal ANT, the isolation between the RF terminals and between the RF terminal and the antenna input-output terminal can be secured. Moreover, when a large grounding electrode GND is disposed in the middle of the lands arranged in this way, the isolation is further improved and a high-frequency module having excellent communication characteristics can be provided.

Furthermore, as described above, when each circuit element constituting the diplexer is constituted by an electrode pattern disposed in each dielectric layer of the laminate, a high-frequency module can be made smaller than in the case where the diplexer is constituted by mounting parts.

Furthermore, as described above, since the transmission signal input terminals Tx12 and Tx34 and the antenna connection terminal ANT are disposed along different sides of the laminate, the terminals are separated from each other and the isolation is improved. Thus, a high-frequency module having excellent communication characteristics can be obtained.

Next, a high-frequency module according to a second preferred embodiment of the present invention is described with reference to FIGS. 5 to 8.

Figure 5:
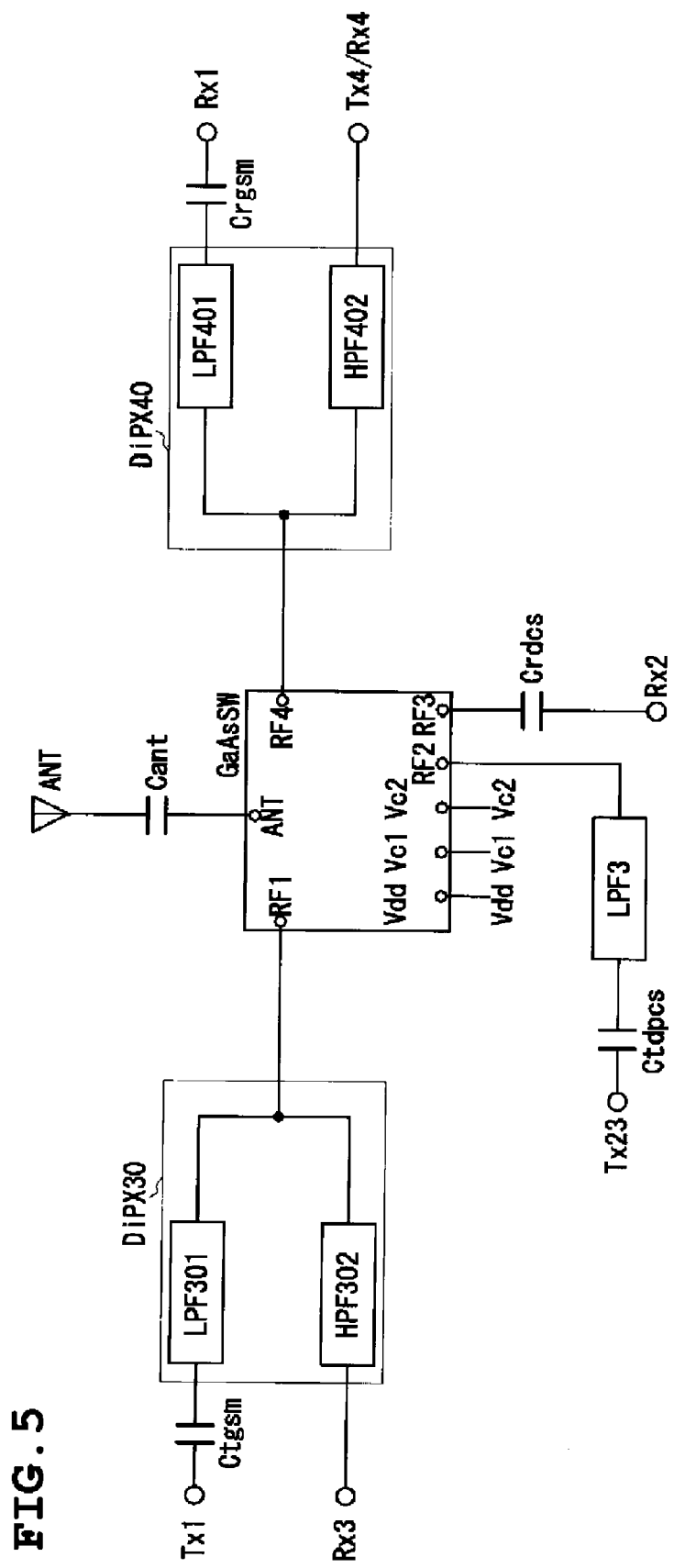
FIG. 5 is a block diagram of a high-frequency module according to a second preferred embodiment of the present invention.
Figure 6:
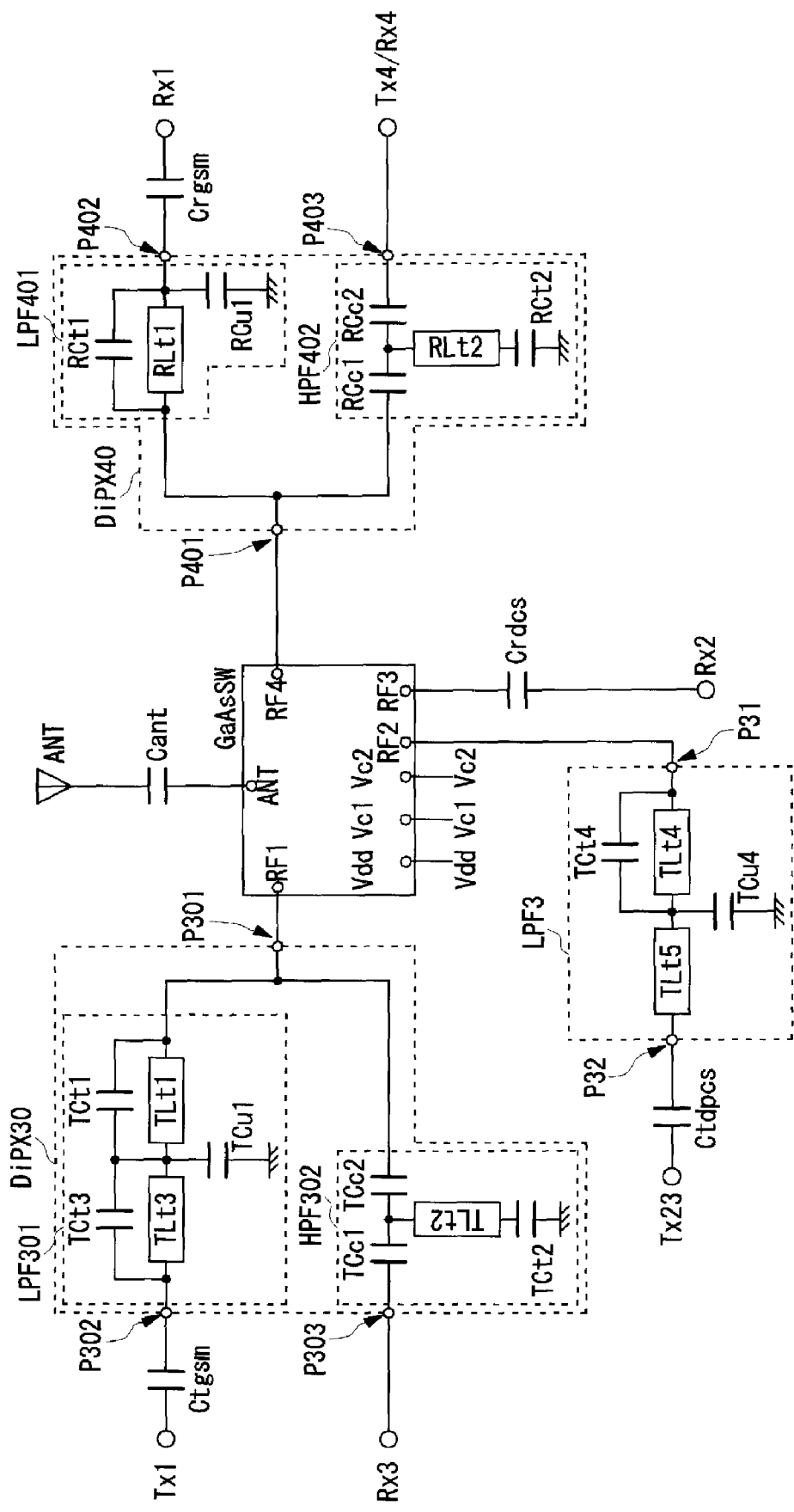
FIG. 6 is an equivalent circuit diagram of the high-frequency module according to a second preferred embodiment of the present invention.

FIG. 5 is a block diagram showing the structure of the high-frequency module according to the present preferred embodiment, and FIG. 6 is an equivalent circuit diagram showing the structure of the high-frequency module according to the present preferred embodiment.

Moreover, in the present preferred embodiment, a GSM transmission signal is inputted from a transmission signal input terminal Tx1 and a GSM reception signal is outputted from a reception signal output terminal Rx1. Then, a DCS/PCS transmission signal is inputted from a transmission signal input terminal Tx23, a DCS reception signal is outputted from a reception signal output terminal Rx2, and a PCS reception signal is outputted from a reception signal output terminal Rx3. Moreover, the case in which a WCDMA transmission-reception signal is inputted and outputted from a transmission-reception signal input-output terminal Tx4/Rx4 is shown. Each of the transmission signal input terminals, reception signal output terminals, and transmission-reception signal input-output terminal corresponds to an input-output portion of various preferred embodiments of the present invention.

In a GaAsSw switch GaAsSw (hereinafter simply referred to as a "GaAsSw"), an antenna input-output terminal ANT connected to an antenna ANT through a capacitor Cant, RF1 terminal to RF4 terminal for inputting and outputting one of transmission-reception signals of GSM/DCS/PCS/WCDMA communication systems, a drive voltage input terminal Vdd, and control signal input terminals Vc1 and Vc2 are provided. In the GaAsSW in which a drive voltage Vdd is applied, the antenna input-output terminal ANT is switched so as to be connected to one of the RF1 terminal to RF4 terminal by a combination of ON/OFF states of two control signals Vc1 and Vc2. The GaAsSW is mounted on the upper surface of a laminate constituting the high-frequency module. The GaAsSW corresponds to an "FET switch" of various preferred embodiments of the present invention, the antenna input-output terminal ANT corresponds to an "antenna input-output portion" of various preferred embodiments of the present invention, the RF1 terminal to RF4 terminal correspond to "signal input-output portions" of various preferred embodiments of the present invention, and the RF1 terminal and RF4 terminal correspond to "signal input-output portions in which transmission signals or reception signals of at least two communication systems are inputted and outputted" of various preferred embodiments of the present invention.

A diplexer DiPX30 including a low-pass filter 301 and a high-pass filter HPF302 is connected to the RF1 terminal of the GaAsSW at the connection point between the low-pass filter LPF301 and the high-pass filter GHPF302. Then, the GSM transmission signal input terminal Tx1 is connected to the terminal portion, opposite to the connection point, of the low-pass filter LPF301 of the diplexer DiPX30 through a capacitor Ctgsm, and the PCS reception signal output terminal Rx3 is connected to the terminal portion, opposite to the connection point, of the high-pass filter HPF302 of the diplexer DiPX30.

One terminal of a low-pass filter LPF3 is connected to the RF2 terminal of the GaAsSW, and the DCS/PCS transmission signal input terminal Tx23 is connected to the other terminal of the low-pass filter LPF3 through a capacitor Ctdpcs.

The DCS reception signal output terminal Rx2 is connected to the RF3 terminal of the GaAsSW through a capacitor Crdcs.

A diplexer DiPX40 including a low-pass filter LPF401 and a high-pass filter HPF402 is connected to the RF4 terminal of the GaAsSW at the connection point between the low-pass filter LPF401 and the high-pass filter HPF402. Then, the GSM reception signal output terminal Rx1 is connected to the terminal portion, opposite to the connection point, of the low-pass filter LPF401 of the diplexer DiPX40 through a capacitor Crgsm, and the WCDMA transmission-reception signal input-output terminal Tx4/Rx4 is connected to the terminal portion, opposite to the connection point, of the high-pass filter HPF402 of the diplexer DiPX40.

Next, the specific circuit structure is described with reference to FIG. 6.

Three input-output portions P301 to P303 are included in the diplexer DiPX30. The input-output portion P301 to be connected to the RF1 terminal of the GaAsSW is connected to the input-output portion P302 on the side of the GSM transmission signal input portion Tx1 through the low-pass filter 301 and simultaneously connected to the input-output portion P303 on the side of the PCS reception signal output terminal Px3 through the high-pass filter HPF302. Here, the low-pass filter LPF301 is set so as to attenuate a signal on the higher-frequency side that is higher than the frequency band of a GSM transmission signal, and the high-pass filter HPF302 is set to attenuate a signal on the lower-frequency side that is lower than a fixed frequency band of a PCS reception signal.

The low-pass filter LPF301 preferably includes a series circuit of a parallel circuit of a capacitor TCt1 and an inductor TLt1 and a parallel circuit of a capacitor TCt3 and an inductor TLt3 connected between the input-output portion P301 and the input-output portion P302, and a capacitor TCu1 connected between the connection portion of the two parallel circuits and the ground. Furthermore, the high-pass filter HPF302 preferably includes capacitors TCc1 and TCc2 connected in series between the input-output portion P301 and the input-output portion P303, and a series circuit of an inductor TLt2 and a capacitor TCt2 connected between the connection point of the capacitors TCc1 and TCc2 and the ground.

Input-output portions P31 and P32 are included in the low-pass filter LPF3, the input-output portion P31 is connected to the RF2 terminal of the GaAsSW, and the input-output portion P32 is connected to the DCS/PCS transmission signal input terminal Tx23 through the capacitor Ctdpcs. Between the input-output portion P31 and the input-output portion P32, a parallel circuit of a capacitor TCt4 and an inductor TLt4 and an inductor TLt5 are connected in series. Furthermore, a capacitor TCu4 is connected between the connection point between the two inductors TLt4 and TLt5 and the ground.

Three input-output portions P401 to P403 are included in the diplexer DiPX40. The input-output portion P401 to be connected to the GaAsSw is connected to the input-output portion P402 on the side of the GSM reception signal output portion Rx1 through the low-pass filter LPF401 and simultaneously connected to the input-output portion P403 on the side of the WCDMA transmission-reception signal input-output terminal Tx4/Rx4 through the high-pass filter HPF402. Here, the low-pass filter LPF401 is set so as to attenuate a signal on the higher-frequency side than the frequency band of a GSM reception signal, and the high-pass filter HPF402 is set to attenuate a signal on the lower-frequency side than the frequency band of a WCDMA communication signal.

The low-pass filter LPF401 includes a parallel circuit of a capacitor RCt1 and an inductor RTt1 connected between the input-output portion P401 and the input-output portion P402 and a capacitor RCu1 connected between the side of the input-output portion P402 of the parallel circuit and the ground. Furthermore, the high-pass filter HPF402 includes capacitors RCc1 and RCc2 connected in series between the input-output portion P401 and the input-output portion P403 and a series circuit of an inductor RLt2 and a capacitor RCt2 connected between the connection point of the capacitors RCc1 and RCc2 and the ground.

The circuit elements constituting the above-described low-pass filter LPF3, diplexer DiPX30, and diplexer DiPX40 are preferably defined by the electrode pattern of each dielectric layer of the laminate constituting the high-frequency module.

Next, the transmission-reception operation of a GSM/DCS/PCS/WCDMA communication signal of the high-frequency module is described.

1) Transmission Operation of a GSM Transmission Signal

When a GSM transmission signal is transmitted, control signals for connecting the antenna input-output terminal ANT and the RF1 terminal are inputted to the control signal input terminals Vc1 and Vc2 of the GaAsSW. When the control signals of the combination are inputted (for example, the control signals of positive voltage are inputted to Vc1 and Vc2), the RF1 terminal and the antenna input-output terminal ANT of the GaAsSW are made conductive to each other. At this point, when the GSM transmission signal is inputted from the GSM transmission signal input terminal Tx1, the GSM transmission signal is inputted to the RF1 terminal through the low-pass filter LPF301 of the diplexer DiPX30 and transmitted from the RF1 terminal to the antenna input-output terminal ANT. The GSM transmission signal is outputted from the antenna input-output terminal ANT to the antenna ANT and transmitted from the antenna ANT to the outside. Here, in the GaAsSW, since the antenna input-output terminal ANT and the RF1 terminal are made conductive to each other and the other RF2 terminal to RF4 terminal are made open, the GSM transmission signal is not transmitted to the other RF2 terminal to RF4 terminal. Thus, the GSM transmission signal is not transmitted to the DCS/PCS transmission signal input terminal Tx23, GSM reception signal output terminal Rx1, DCS reception signal output terminal Rx2, and WCDMA transmission-reception signal input-output terminal Tx4/Rx4. Furthermore, since the high-pass filter HPF302 of the diplexer DiPX30 attenuates a signal on the lower-frequency side than the frequency band of a PCS reception signal as described above, the GSM transmission signal is attenuated by the high-pass filter HPF302 and not transmitted to the PCS reception signal output terminal Rx3.

2) Transmission Operation of a DCS/PCS Transmission Signal

When a DCS transmission signal or PCS transmission signal (hereinafter generally referred to as a "DCS/PCS transmission signal") is transmitted, control signals for connecting the antenna input-output terminal ANT and the RF2 terminal are inputted to the control terminals Vc1 and Vc2 of the GaAsSW. When the control signals for the combination (for example, the control signal of positive voltage is inputted to Vc1 and the control signal of zero voltage or negative voltage is inputted to Vc2), the RF2 terminal and the antenna input-output terminal ANT of the GaAsSW are made conductive to each other. At this point, when the DCS/PCS transmission signal is inputted from the DCS/PCS transmission signal input terminal Tx23, the DCS/PCS transmission signal is inputted to the RF2 terminal through the low-pass filter LPF3 and transmitted from the FR terminal RF2 to the antenna input-output terminal ANT. The DCS/PCS transmission signal is outputted from the antenna input-output terminal ANT to the antenna ANT and transmitted from the antenna to the outside. Here, in the GaAsSW, since the antenna input-output terminal ANT and the RF2 terminal are made conductive to each other and the other RF1 terminal, RF3 terminal, and RF4 terminal are made open, the DCS/PCS transmission signal is not transmitted to the other RF1 terminal, RF3 terminal, and RF4 terminal. Thus, the DCS/PCS transmission signal is not transmitted to the GSM transmission signal input terminal Tx1, GSM reception signal output terminal Rx1, DCS reception signal output terminal Rx2, PCS reception signal output terminal Rx3, and WCDMA transmission-reception signal input-output terminal Tx/Rx4.

3) Transmission Operation of a GSM Reception Signal

When a GSM reception signal is transmitted, control signals for connecting the antenna input-output terminal ANT and the RF4 terminal are inputted to the control signal input terminals Vc1 and Vc2 of the GaAsSW. When the control signals of the combination are inputted (for example, the control signals of zero voltage or negative voltage are inputted to Vc1 and Vc2), the antenna input-output terminal ANT and the RF4 terminal of the GaAsSW are made conductive to each other. At this point, when the GSM reception signal is inputted from the antenna input-output terminal ANT, the GSM reception signal is transmitted from the antenna input-output terminal ANT to the RF4 terminal. Here, in the GaAsSW, since the antenna input-output terminal ANT and the RF4 terminal are made conductive to each other and the other RF1 terminal, RF2 terminal, and RF3 terminal are made open, the GSM reception signal is not transmitted to the other RF1 terminal, RF2 terminal, and RF3 terminal. Thus, the GSM reception signal is not transmitted to the GSM transmission signal input terminal Tx1, DCS/PCS transmission signal input terminal Tx23, DCS reception signal output terminal Rx2, and PCS reception signal output terminal Rx3.

The GSM reception signal outputted from the RF4 terminal is inputted to the input-output portion P401 of the diplexer DiPX40, passes through the low-pas filter LPF401 of the diplexer DiPX40 and is outputted to the input-output portion P402, and is transmitted to the GSM reception signal output terminal Rx1 through the capacitor Crgsm. Here, as described above, since the high-pass filter HPF402 attenuates the lower-frequency side than the frequency band of a WCDMA transmission-reception signal, the GSM reception signal is attenuated by the high-pass filter HPF402 and not transmitted to the WCDMA transmission-reception signal input-output terminal Tx4/Rx4.

4) Transmission Operation of a DCS Reception Signal

When a DCS reception signal is transmitted, control signals for connecting the antenna input-output terminal ANT and the RF3 terminal are inputted to the control signal input terminals Vc1 and Vc2 of the GaAsSW. When the control signals of the combination are inputted (for example, the control signal of zero voltage or negative voltage is inputted to Vc1 and the control voltage of positive voltage is inputted to Vc2), the antenna input-output terminal ANT and the RF3 terminal of the GaAsSw are made conductive to each other. At this point, when the DCS reception signal is inputted from the antenna input-output terminal ANT, the DCS reception signal is transmitted from the antenna input-output terminal ANT to the RF3 terminal. Here, in the GaAsSW, since the antenna input-output terminal ANT and the RF3 terminal are made conductive to each other and the other RF1 terminal, RF2 terminal, and RF4 terminal are made open, the DCS reception signal is not transmitted to the other RF1 terminal, RF2 terminal, and RF4 terminal. Thus, the DCS reception signal is not transmitted to the GSM transmission signal input terminal Tx1, DCS/PCS transmission signal input terminal Tx23, PCS transmission signal output terminal Rx3, and WCDMA transmission-reception signal input-output terminal Tx4/Rx4.

The DCS reception signal outputted from the RF3 terminal is transmitted to the DCS reception signal output terminal Rx2 through the capacitor Crdcs.

5) Transmission Operation of a PCS Reception Signal

When a PCS reception signal is transmitted, control signals for connecting the antenna input-output terminal ANT and the RF1 terminal are inputted to the control signal input terminals Vc1 and Vc2 of the GaAsSW. When the control signals of the combination are inputted (for example, the control signals of positive voltage are inputted to Vc1 and Vc2), the antenna input-output terminal ANT and the RF1 terminal of the GaAsSw are made conductive to each other. At this point, when the PCS reception signal is inputted from the antenna input-output terminal ANT, the PCS reception signal is transmitted from the antenna input-output terminal ANT to the RF1 terminal. Here, in the GaAsSW, since the antenna input-output terminal ANT and the RF1 terminal are made conductive to each other and the other RF2 terminal, RF3 terminal, and RF4 terminal are made open, the PCS reception signal is not transmitted to the other RF2 terminal, RF3 terminal, and RF4 terminal. Thus, the PCS reception signal is not transmitted to the DCS/PCS transmission signal input terminal Tx23, GSM reception output terminal Rx1, DCS reception signal output terminal Rx2, and WCDMA transmission-reception signal input-output terminal Tx4/Rx4.

The PCS reception signal outputted from the RF1 terminal is inputted to the input-output portion P301 of the diplexer DiPX30, passes through the high-pass filter HPF302 of the diplexer DiPX30 and is outputted to the input-output portion P303, and is transmitted to the DCS reception signal output terminal Rx3. Here, as described above, since the low-pass filter LPF301 attenuates the higher-frequency side than the frequency band of a GSM transmission signal, the PCS reception signal is attenuated by the low-pass filter LPF301 and not transmitted to the GSM transmission signal input terminal Tx1.

6) Transmission Operation of a WCDMA Transmission-Reception Signal

When a WCDMA transmission-reception signal is transmitted, control signals for connecting the antenna input-output terminal ANT and the RF4 terminal are inputted to the control signal input terminals Vc1 and Vc2 of the GaAsSW. When the control signals of the combination are inputted (for example, the control signals of zero voltage or negative voltage are inputted to Vc1 and Vc2), the antenna input-output terminal ANT and the RF4 terminal of the GaAsSW are made conductive to each other. At this point, when the WCDMA transmission signal is inputted from the WCDMA transmission-reception signal input-output terminal Tx4/Rx4, the WCDMA transmission signal is inputted to the RF4 terminal through the high-pass filter HPF402 of the diplexer DiPX40 and transmitted from the RF4 terminal to the antenna input-output terminal ANT. The WCDMA transmission signal is outputted from the antenna input-output terminal ANT to the antenna ANT and transmitted from the antenna to the outside. Here, in the GaAsSW, since the antenna input-output terminal ANT and the RF4 terminal are made conductive to each other and the other RF1 terminal, RF2 terminal, and RF3 terminal are made open, the WCDMA transmission signal is not transmitted to the other RF1 terminal, RF2 terminal, and RF3 terminal. Thus, the WCDMA transmission signal is not transmitted to the GSM transmission signal input terminal Tx1, DCS/PCS transmission signal input terminal Tx23, DCS reception signal output terminal Rx2, and PCS reception signal output terminal Rx3. Furthermore, since the low-pass filter LPF401 of the diplexer DiPX40 attenuates a signal on the higher-frequency side than the frequency band of a GSM reception signal as described above, the WCDMA transmission signal is attenuated by the low-pass filter LPF401 and not transmitted to the GSM reception signal output terminal Rx1.

On the other hand, when the WCDMA reception signal is inputted from the antenna input-output terminal ANT, the WCDMA reception signal is transmitted from the antenna input-output terminal ANT to the RF4 terminal. Here, in the GaAsSW, since the antenna input-output terminal ANT and the RF4 terminal are made conductive to each other and the other RF1 terminal, RF2 terminal, and RF3 terminal are made open, the WCDMA reception signal is not transmitted to the other RF1 terminal, RF2 terminal, and RF3 terminal. Thus, the WCDMA reception signal is not transmitted to the GSM transmission signal input terminal TX1, DCS/PCS transmission signal input terminal Tx23, DCS reception signal output terminal Rx2, and PCS reception signal output terminal Rx3.

The WCDMA reception signal outputted from the RF4 terminal is inputted to the input-output portion P401 of the diplexer DiPX40, passes through the high-pass filter HPF402 of the diplexer DiPX40 and is outputted to the input-output portion P403, and is transmitted to the WCDMA transmission-reception signal input-output terminal Tx4/Rx4. Here, since the low-pass filter LPF401 attenuates the higher-frequency side than frequency band of a GSM reception signal, the WCDMA reception signal is attenuated by the low-pass filter LPF401 and not transmitted to the GSM reception signal output terminal Rx1.

With such a unique structure, a high-frequency module for transmitting and receiving communication signals of four kinds of GSM/DCS/PCS/WCDMA from one antenna can be provided.

Next, the structure of a laminate of the high-frequency module is described with reference to FIGS. 7 and 8.

Figure 7:
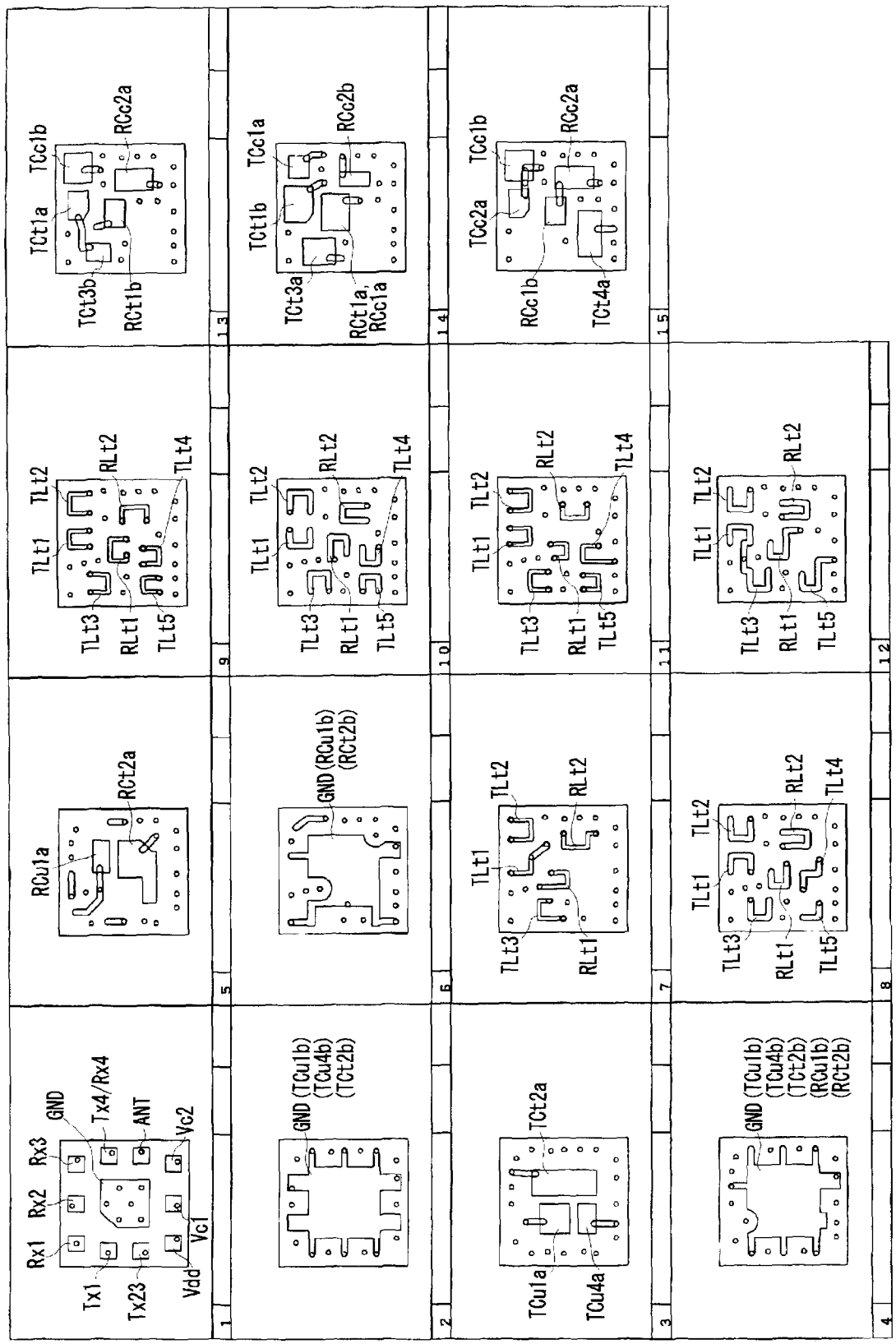
FIG. 7 is a lamination drawing of the high-frequency module shown in FIGS. 5 and 6.
Figure 8:
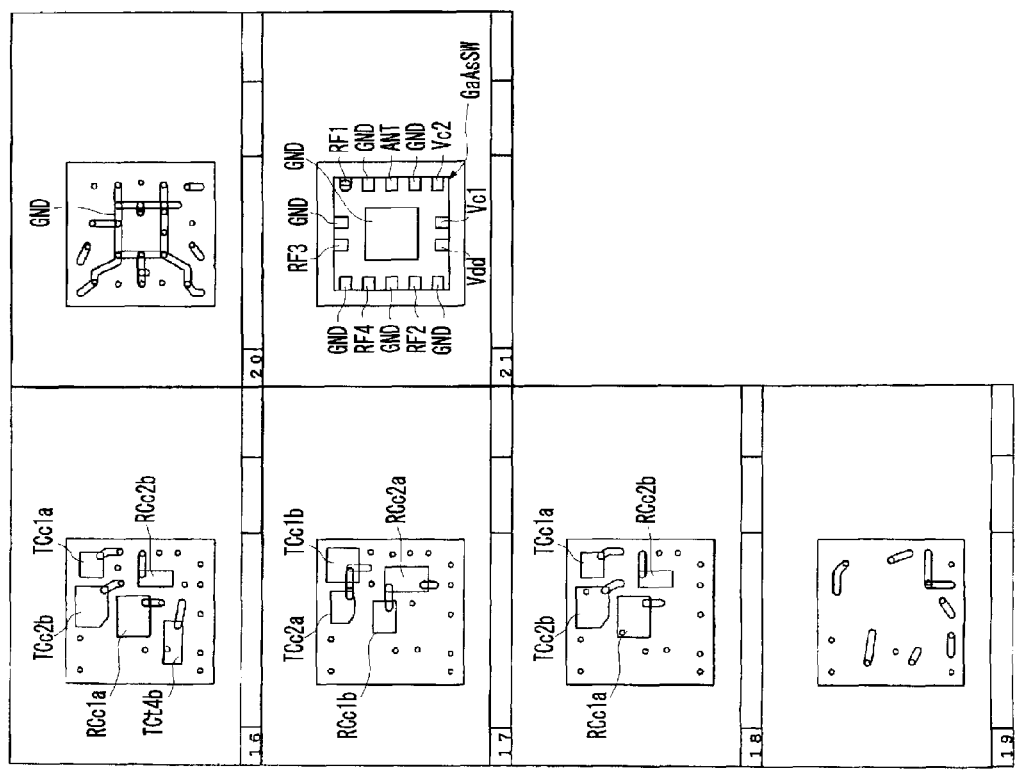
FIG. 8 is another lamination drawing of the high-frequency module shown in FIGS. 5 and 6.

FIGS. 7 and 8 are lamination drawings of the high-frequency module according to another preferred embodiment of the present invention.

In the laminate-type high-frequency module of the present preferred embodiment, each of dielectric layers 1 to 20 shown in FIGS. 7 and 8 is laminated from the bottom in order. However, each drawing in FIGS. 7 and 8 shows the state when seen from the lower side (side facing a mounting substrate). Then, what is shown as a dielectric layer 21 is the bottom surface of the dielectric layer 20 (upper surface of the laminate), that is, the electrodes and portions of the part mounting surface are shown. Moreover, the symbols shown in FIGS. 7 and 8 correspond to the symbol of each element shown in FIGS. 5 and 6.

Various external terminal electrodes to be mounted on the mounting substrate are disposed on the lower surface of the lowermost dielectric layer 1. That is, the GSM transmission signal input terminal Tx1, DCS/PCS transmission signal input terminal Tx23, GSM reception signal output terminal Rx1, DCS reception signal output terminal Rx2, PCS reception signal output terminal Rx3, WCDMA transmission-reception signal input-output terminal Tx4/Rx4, each of control signal input terminals Vc1 and Vc2, drive voltage input terminal Vdd, ground (grounding) terminal GND, and antenna connection terminal ANT are provided. Here, the antenna connection terminal ANT is arranged so as to be spaced away from the GSM transmission signal input terminal Tx1 and DCS/PCS transmission signal input terminal Tx23. For example, as shown in FIG. 7, when the transmission signal input terminals Tx1 and Tx23 are disposed along one side surface (left side surface when seen from the front of the drawing) of the laminate, the antenna connection terminal ANT is disposed along the side surface (right side surface when seen from the front of the drawing), opposite to the left side surface.

A common ground electrode GND is disposed in the dielectric layer 2, and the common ground electrode GND is also used as the opposite electrodes TCu1b, TCu4b, and RCt2b of the capacitors TCu1, TCu4, and TCt2.

In the dielectric layer 3, the opposite electrodes TCu1a, TCu4a, and TCt2a of the capacitors TCu1, TCu4, and TCt2 are provided.

In the dielectric layer 4, a common ground electrode GND is disposed, and the common ground electrode GND is also used as the opposite electrodes TCu1b, TCu4b, TCt2b, RCu1b, and RCt2b of the capacitors TCu1, TCu4, RCt2, RCu1, and RCt2.

In the dielectric layer 5, the opposite electrodes RCu1a and RCt2a of the capacitors RCu1 and RCt2 are provided.

In the dielectric layer 6, a common ground electrode GND is provided and the common ground is also used as the opposite electrodes RCu1b and RCt2b of the capacitors RCu1 and RCt2.

In the dielectric layers 7 to 12, the inductors TLt1, TLt2, TLt3, RLt1, RLt2, RLt3, and RLt4 are disposed; in the dielectric layers 8 to 12, the inductor TLt5 is disposed; and in the dielectric layers 8 to 11, the inductor TLt4 is disposed.

In the dielectric layer 13, the opposite electrodes TCt1*a*, Tct3*b*, TCc1*b*, RCt1*b*, and RCc2*a* of the capacitors TCt1, Tct3, TCc1, TCt1, and RCc2 are provided.

In the dielectric layer 14, the opposite electrodes TCt1*b*, Tct3*a*, TCc1*a*, RCt1*a*, and RCc2*b* of the capacitors TCt1, Tct3, TCc1, RCt1, and RCc2 are provided, and the opposite electrode RCt1*a* is also used as the opposite electrode RCc1*a* of the capacitor RCc1.

In the dielectric layer 15, the opposite electrodes RCc1*b*, TCc1*b*, and RCc2*a* of the capacitors RCc1, TCc1, and RCc2 are formed, and simultaneously the opposite electrodes TCc2*a* and TCt4*a* of the capacitors TCc2 and TCt4 are formed.

In the dielectric layer 16, the opposite electrodes RCc1*a*, TCc1*a*, TCc2*b*, RCc2*b*, and TCt4*b* of the capacitors RCc1, TCc1, TCc2, RCc2, and TCt4 are disposed.

In the dielectric layer 17, the opposite electrodes RCc1*b*, TCc1*b*, TCc2*a*, and RCc2*a* of the capacitors RCc1, TCc1, TCc2, and RCc2 are disposed.

In the dielectric layer 18, the opposite electrodes RCc1*a*, TCc1*a*, TCc2*b*, and RCc2*b* of the capacitors RCc1, TCc1, TCc2, and RCc2 are provided.

In the dielectric layer 19, a wiring pattern is disposed, and, in the dielectric layer 20, a wiring pattern for making the grounding electrode and grounding terminal GND in the lower layer and each grounding electrode disposed on the back surface 21 of the dielectric layer 20 as the uppermost layer conductive therebetween is provided.

On the back surface of the uppermost dielectric layer 20, that is, on the upper surface 21 of the laminate, the lands for mounting the GaAsSW are arranged along the side walls of the laminate and, in the center of the land group in such an arrangement, a wider grounding electrode layer than the group of the other lands is arranged in a substantially square configuration. Here, regarding the arrangement of the land group, the land GND for the grounding, the land RF4 for the RF4 terminal, the land GND for the grounding, the land RF2 for the RF2 terminal, the land for the grounding, the land RF2 for the RF2 terminal, and the land GND for the grounding are arranged from the top in order along the left side of the dielectric layer 21 in FIG. 4 when the drawing is seen as it is; the land Vdd for the drive voltage Vdd and the land Vc1 for the control signal Vc1 are arranged from the left in order along the lower side; the land Vc2 for the control signal Vc2, the land GND for the grounding, the land ANT for the antenna input-output terminal, the land GND for the grounding, and the land RF1 for the RF1 terminal are arranged from the bottom in order along the right side; and the land GND for the grounding and the land RF3 for the RF3 terminal are arranged from the right in order along the upper side. In this way, the GaAsSW is mounted on the lands arranged as described above.

In this way, the same structure as the high-frequency module shown in the above-described first preferred embodiment can be also applied to a high-frequency module for transmitting and receiving a GSM/DCS/PCS/WCDMA communication signal and the same advantages can be obtained.

Next, a high-frequency module according to a third preferred embodiment of the present invention is described with reference to FIGS. 9 to 12.

Figure 9:
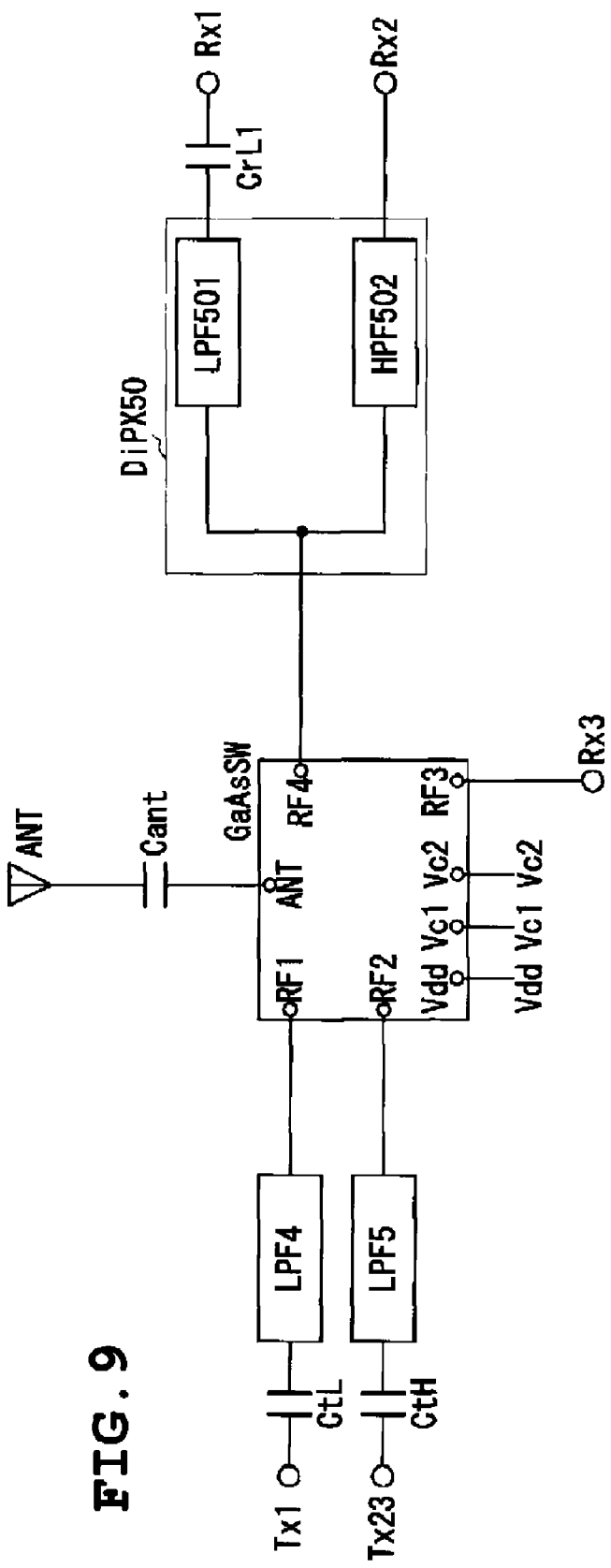
FIG. 9 is a block diagram of a high-frequency module according to a third preferred embodiment of the present invention.
Figure 10:
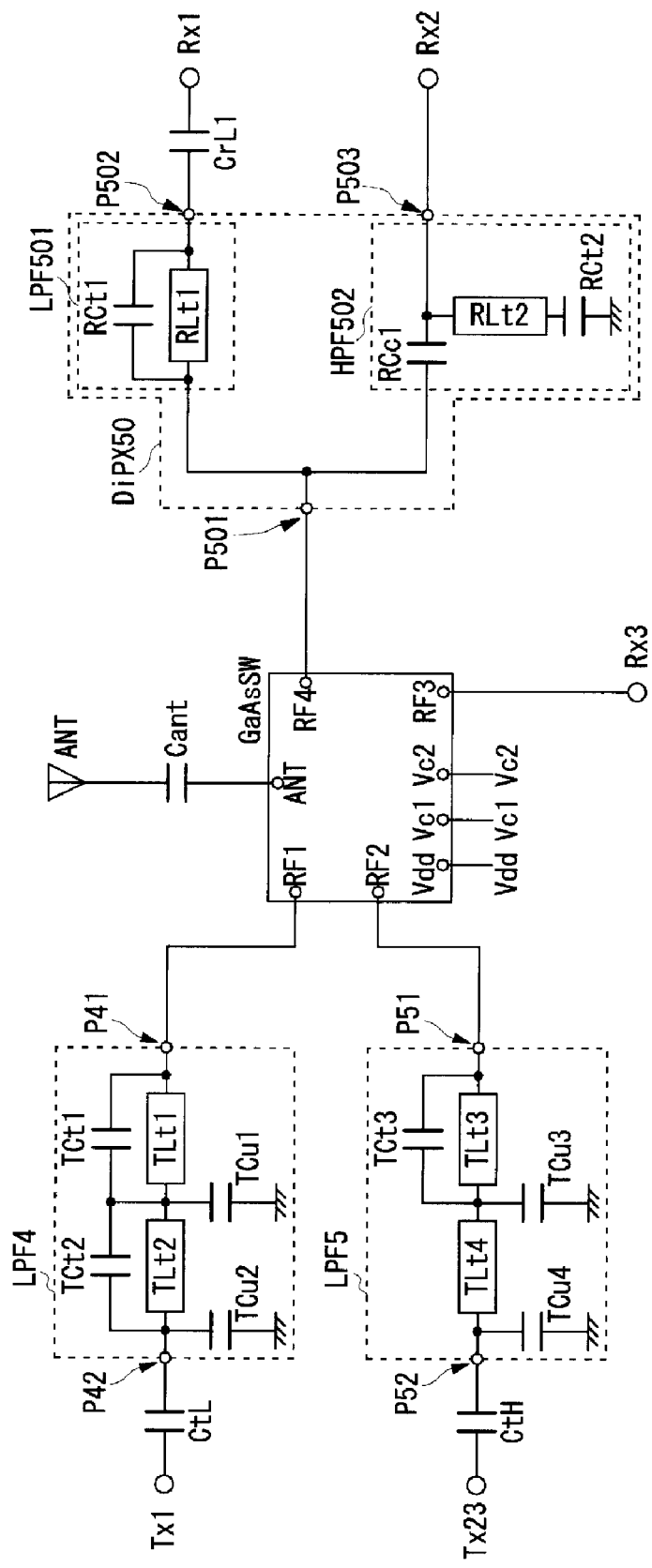
FIG. 10 is an equivalent circuit diagram of the high-frequency module according to a second preferred embodiment of the present invention.

FIG. 9 is a block diagram showing the structure of the high-frequency module according to another preferred embodiment of the present invention, and FIG. 10 is an equivalent circuit diagram showing the structure of the high-frequency module according to the present preferred embodiment.

Moreover, in the present preferred embodiment, a GSM transmission signal is inputted from a transmission signal input terminal Tx1, and a GSM reception signal is outputted from a reception signal output terminal Rx1. Then, a DCS/PCS transmission signal is inputted from a transmission signal input terminal Tx23, a DCS reception signal is outputted from a reception signal output terminal Rx2, and a PCS reception signal is outputted from a reception signal output terminal Rx3. Each of the transmission signal input terminals, reception signal output terminals, and transmission-reception signal input-output terminal corresponds to an "input-output portion" of various preferred embodiments of the present invention.

In a GaAsSw switch GaAsSw (hereinafter simply referred to as a "GaAsSw"), an antenna input-output terminal ANT connected to an antenna ANT through a capacitor Cant, RF1 terminal to RF4 terminal for inputting and outputting one of transmission-reception signals of GSM/DCS/PCS communication systems, a drive voltage input terminal Vdd, and control signal input terminals Vc1 and Vc2 are provided. In the GaAsSW in which a drive voltage Vdd is applied, the RF1 terminal to RF4 terminal are switched so as to be connected to the antenna input-output terminal ANT by a combination of ON/OFF states of two control signals Vc1 and Vc2. The GaAsSW is mounted on the upper surface of a laminate constituting the high-frequency module. The GaAsSW corresponds to an "FET switch" of various preferred embodiments of the present invention, the antenna input-output terminal ANT corresponds to an "antenna input-output portion" of various preferred embodiments of the present invention, the RF1 terminal to RF4 terminal correspond to "signal input-output portions" of various preferred embodiments of the present invention, and the RF4 terminal corresponds to a "signal input-output portion in which transmission signals or reception signals of at least two communication systems are inputted and outputted" of various preferred embodiments of the present invention.

One terminal of a low-pass filter LPF4 is connected to the RF1 terminal of the GaAsSW, and the GSM transmission signal input terminal Tx1 is connected to the other terminal of the low-pass filter LPF4 through a capacitor CtL.

One terminal of a low-pass filter LPF5 is connected to the RF2 terminal of the GaAsSW, and the DCS/PCS transmission signal input terminal Tx23 is connected to the other terminal of the low-pass filter LPF5 through a capacitor CtH.

The PCS reception signal output terminal Rx3 is connected to the RF3 terminal of the GaAsSw.

A diplexer DiPX50 including a low-pass filter LPF501 and a high-pass filter HPF502 is connected to the RF4 terminal of the GaAsSW at the connection point between the low-pass filter LPF501 and the high-pass filter HPF502. Then, the GSM reception signal output terminal Rx1 is connected to the terminal portion, opposite to the connection point, of the low-pass filter LPF501 of the diplexer DiPX50 through a capacitor CrL1, and the DCS reception signal output terminal Rx2 is connected to the terminal portion, opposite to the connection point, of the high-pass filter LPF502 of the diplexer DiPX50.

Next, the specific circuit structure is described with reference to FIG. 10.

Input-output portions P41 and P42 are included in the low-pass filter LPF4, the input-output portion P41 is connected to the RF1 terminal of the GaAsSw, and the input-output portion P42 is connected to the GSM transmission signal input terminal Tx1 through the capacitor CtL. Between the input-output portion P41 and the input-output portion P42, a series circuit of a parallel circuit of a capacitor TCt1 and an inductor TLt1 and a parallel circuit of a capacitor TCt2 and an inductor TLt2 is connected. A capacitor TCu1 is connected between the connection point of the two parallel circuits and the ground, and a capacitor TCu2 is connected between the side of the input-output portion P42 of the parallel circuit of the capacitor TCt2 and the inductor TLt2 and the ground.

Input-output portions P51 and P52 are included in the low-pass filter LPF5, the input-output portion P51 is connected to the RF2 terminal of the GaAsSW, and the input-output portion P52 is connected to the DCS/PCS transmission signal input terminal Tx23 through the capacitor CtH. Between the input-output portion P51 and the input-output portion P52, a parallel circuit of a capacitor TCt3 and an inductor TLt3 and an inductor TLt4 are connected in series. A capacitor TCu3 is connected between the connection point of the two inductors TLt3 and TLt4 and the ground, and a capacitor TCu4 is connected between the side of the input-output portion P52 of the inductor TLt4 and the ground.

Three input-output portions P501 to P503 are included in the diplexer DiPX50. The input-output portion P501 to be connected to the RF4 terminal of the GaAsSW is connected to the input-output portion P502 on the side of the GSM reception signal output portion Rx1 through the low-pass filter LPF501 and simultaneously connected to the input-output portion P503 on the side of the DCS reception signal output terminal Rx2 through the high-pass filter HPF502. Here, the low-pass filter LPF501 is set so as to attenuate a signal on the higher-frequency side that is higher than the frequency band of a GSM reception signal and the high-pass filter HPF502 is set to attenuate a signal on the lower-frequency side that is lower than the frequency band of a DCS reception signal.

The low-pass filter LPF501 preferably includes a parallel circuit of a capacitor RCt1 and an inductor RLt1 connected between the input-output portion P501 and the input-output portion P502. Furthermore, the high-pass filter HPF502 preferably includes a capacitor RCc1 connected between the input-output portion P501 and the input-output portion P503 and a series circuit of an inductor RLt2 and a capacitor RCt2 connected between the side of the input-output portion P503 of the capacitor RCc1 and the ground.

The circuit elements constituting the above-described low-pass filters LPF4 and LPF5 and diplexer DiPX50 are preferably defined by the electrode pattern of each dielectric layer of a laminate constituting the high-frequency module.

Next, the transmission-reception operation of a GSM/DCS/PCS communication signal of the high-frequency module is described.

1) Transmission Operation of a GSM Transmission Signal

When a GSM transmission signal is transmitted, control signals for connecting the antenna input-output terminal ANT and the RF1 terminal are inputted to the control signal input terminals Vc1 and Vc2 of the GaAsSW. When the control signals of the combination are inputted (for example, the control signals of positive voltage are inputted to Vc1 and Vc2), the RF1 terminal and the input-output terminal ANT of the GaAsSW are made conductive to each other. At this point, when the GSM transmission signal is inputted from the GSM transmission signal input terminal Tx1, the GSM transmission signal is inputted to the RF1 terminal through the low-pass filter LPF4 and transmitted from the RF1 terminal to the antenna input-output terminal ANT. The GSM transmission signal is outputted from the antenna input-output terminal ANT to the antenna ANT and transmitted from the antenna ANT to the outside. Here, in the GaAsSW, since the antenna input-output terminal ANT and the RF1 terminal are made conductive to each other and the other RF2 terminal, RF3 terminal, and RF4 terminal are made open, the GSM transmission signal is not transmitted to the other RF2 terminal, RF3 terminal, and RF4 terminal. Thus, the GSM transmission signal is not transmitted to the DCS/PCS transmission signal input terminal Tx23, GSM reception signal output terminal Rx1, DCS reception signal output terminal Rx2, and PCS reception signal output terminal Rx3.

2) Transmission Operation of a DCS/PCS Transmission Signal

When a DCS transmission signal or PCS transmission signal (hereinafter generally referred to as a "DCS/PCS transmission signal") is transmitted, control signals for connecting the antenna input-output terminal ANT and the RF2 terminal are inputted to the control terminals Vc1 and Vc2 of the GaAsSW. When the control signals for the combination (for example, the control signal of positive voltage is inputted to Vc1 and the control signal of zero voltage or negative voltage is inputted to Vc2), the RF2 terminal and the antenna input-output terminal ANT of the GaAsSW are made conductive to each other. At this point, when the DCS/PCS transmission signal is inputted from the DCS/PCS transmission signal input terminal Tx23, the DCS/PCS transmission signal is inputted to the RF2 terminal through the low-pass filter LPF5 and transmitted from the FR2 terminal to the antenna input-output terminal ANT. The DCS/PCS transmission signal is outputted from the antenna input-output terminal ANT to the antenna ANT and transmitted from the antenna to the outside. Here, in the GaAsSW, since the antenna input-output terminal ANT and the RF2 terminal are made conductive to each other and the other RF1 terminal, RF3 terminal, and RF4 terminal are made open, the DCS/PCS transmission signal is not transmitted to the other RF1 terminal, RF3 terminal, and RF4 terminal. Thus, the DCS/PCS transmission signal is not transmitted to the GSM transmission signal input terminal Tx1, GSM reception signal output terminal Rx1, DCS reception signal output terminal Rx2, and PCS reception signal output terminal Rx3.

3) Transmission Operation of a GSM Reception Signal

When a GSM reception signal is transmitted, control signals for connecting the antenna input-output terminal ANT and the RF4 terminal are inputted to the control signal input terminals Vc1 and Vc2 of the GaAsSW. When the control signals of the combination are inputted (for example, the control signals of zero voltage or negative voltage are inputted to Vc1 and Vc2), the antenna input-output terminal ANT and the RF4 terminal of the GaAsSW are made conductive to each other. At this point, when the GSM reception signal is inputted from the antenna input-output terminal ANT, the GSM reception signal is transmitted from the antenna input-output terminal ANT to the RF4 terminal. Here, in the GaAsSW, since the antenna input-output terminal ANT and the RF4 terminal are made conductive to each other and the other RF1 terminal, RF2 terminal, and RF3 terminal are made open, the GSM reception signal is not transmitted to the other RF1 terminal, RF2 terminal, and RF3 terminal. Thus, the GSM reception signal is not transmitted to the GSM transmission signal input terminal Tx1, DCS/PCS transmission signal input terminal Tx23, and PCS reception signal output terminal Rx3.

The GSM reception signal outputted from the RF4 terminal is inputted to the input-output portion P501 of the diplexer DiPX50, passes through the low-pas filter LPF501 of the diplexer DiPX50 and is outputted to the input-output portion P502, and is transmitted to the GSM reception signal output terminal Rx1 through the capacitor CrL1. Here, as described above, since the high-pass filter HPF502 attenuates the lower-frequency side than the frequency band of a DCS reception signal, the GSM reception signal is attenuated by the high-pass filter HPF502 and not transmitted to the DCS reception signal output terminal Rx2.

4) Transmission Operation of a DCS Reception Signal

When a DCS reception signal is transmitted, control signals for connecting the antenna input-output terminal ANT and the RF3 terminal are inputted. When the control signals of the combination are inputted to the control signal input terminals Vc1 and Vc2 of the GaAsSW (for example, the control signals of zero voltage or negative voltage are inputted to Vc1 and Vc2), the antenna input-output terminal ANT and the RF4 terminal of the GaAsSw are made conductive to each other. At this point, when the DCS reception signal is inputted from the antenna input-output terminal ANT, the DCS reception signal is transmitted from the antenna input-output terminal ANT to the RF4 terminal. Here, in the GaAsSW, since the antenna input-output terminal ANT and the RF4 terminal are made conductive to each other and the other RF1 terminal, RF2 terminal, and RF3 terminal are made open, the DCS reception signal is not transmitted to the other RF1 terminal, RF2 terminal, and RF3 terminal. Thus, the DCS reception signal is not transmitted to the GSM transmission signal input terminal Tx1, DCS/PCS transmission signal input terminal Tx23, and PCS transmission signal output terminal Rx3.

The DCS reception signal outputted from the RF4 terminal is inputted to the input-output portion P501 of the diplexer DiPX50, passes through the high-pass filter HPF502 of the diplexer DiPX50 and is outputted to the input-output portion P503, and is transmitted to the DCS reception signal output terminal Rx2. Here, since the low-pass filter LPF501 attenuates the higher-frequency side than the frequency band of a GSM reception signal, the DCS reception signal is attenuated by the low-pass filter LPF 501 and not transmitted to the GSM reception signal output terminal Rx1.

5) Transmission Operation of a PCS Reception Signal

When a PCS reception signal is transmitted, control signals for connecting the antenna input-output terminal ANT and the RF3 terminal are inputted to the control signal input terminals Vc1 and Vc2 of the GaAsSW. When the control signals of the combination are inputted (for example, the control signal of zero voltage or negative voltage is inputted to Vc1 and the control signal of positive voltage is inputted to Vc2), the antenna input-output terminal ANT and the RF3 terminal of the GaAsSw are made conductive to each other. At this point, when the PCS reception signal is inputted from the antenna input-output terminal ANT, the PCS reception signal is transmitted from the antenna input-output terminal ANT to the RF3 terminal. Here, in the GaAsSW, since the antenna input-output terminal ANT and the RF3 terminal are made conductive to each other and the other RF1 terminal, RF2 terminal, and RF4 terminal are made open, the PCS reception signal is not transmitted to the other RF1 terminal, RF2 terminal, and RF4 terminal. Thus, the PCS reception signal is not transmitted to the GSM transmission signal input terminal Tx1, DCS/PCS transmission signal input terminal Tx23, GSM reception signal output terminal Rx1, and DCS reception signal output terminal Rx2.

The DCS reception signal outputted from the RF3 terminal is transmitted to the PCS reception signal output terminal Rx3.

With this unique construction, a high-frequency module for transmitting and receiving communication signals of three kinds of GSM/DCS/PCS from one antenna can be provided.

Next, the structure of a laminate of the high-frequency module is described with reference to FIGS. 11 and 12.

Figure 11:
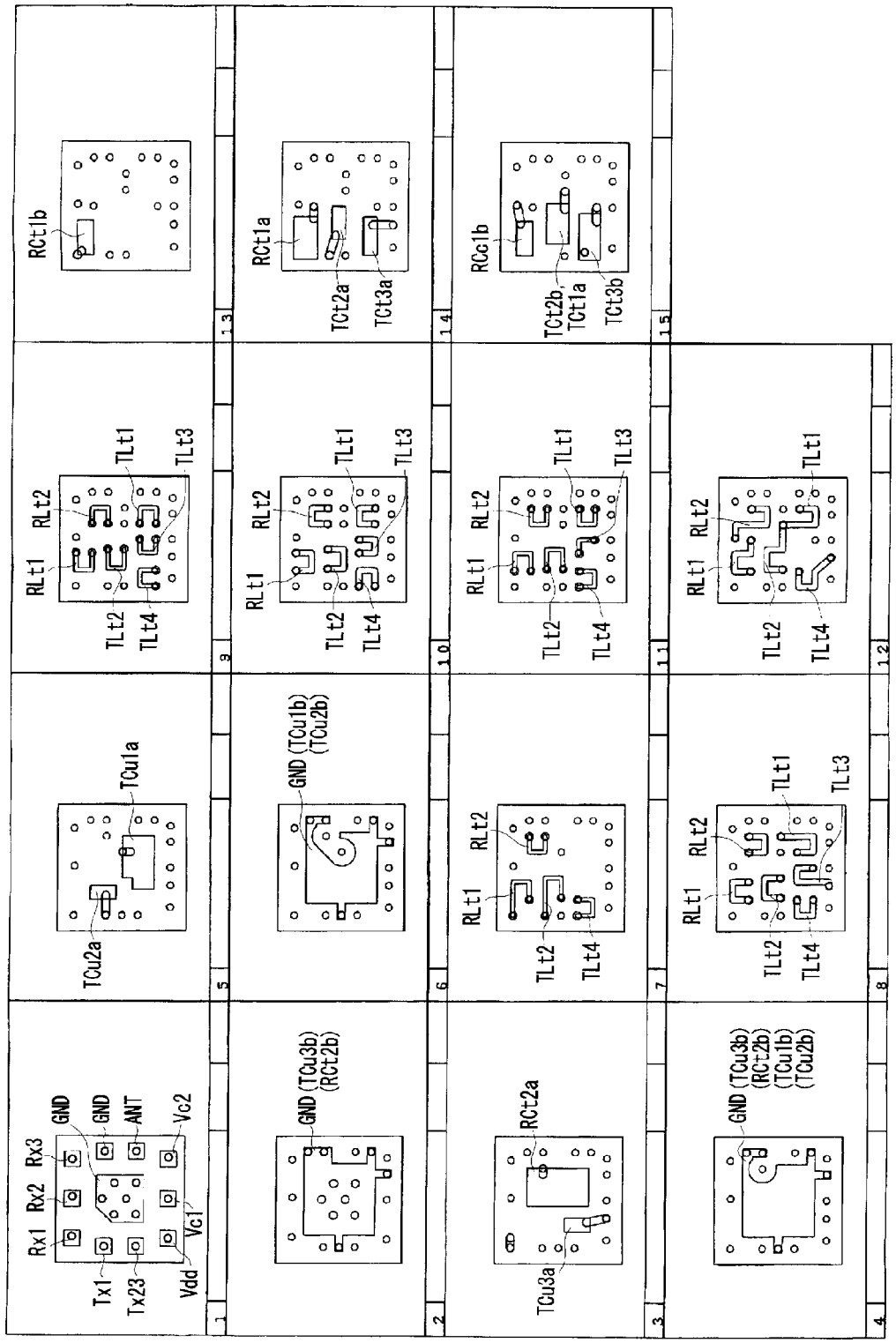
FIG. 11 is a lamination drawing of the high-frequency module shown in FIGS. 9 and 10.
Figure 12:
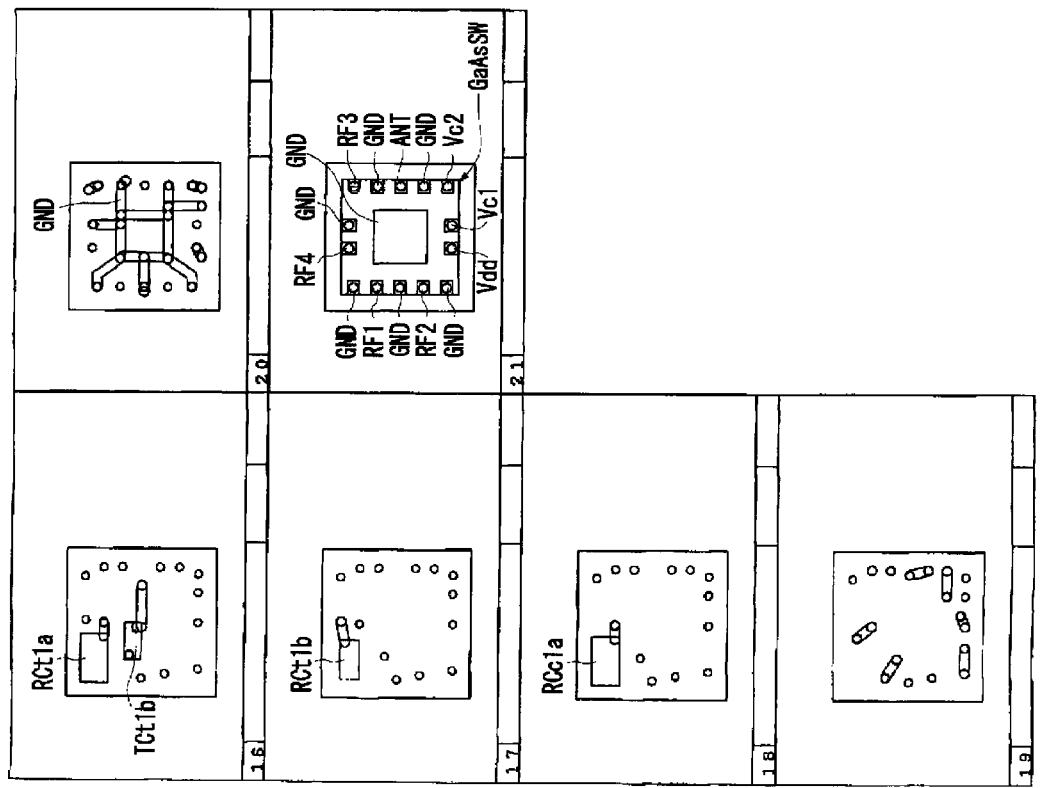
FIG. 12 is another lamination drawing of the high-frequency module shown in FIGS. 9 and 10.

FIGS. 11 and 12 are lamination drawings of the high-frequency module according to a further preferred embodiment of the present invention.

In the laminate-type high-frequency module, each of dielectric layers 1 to 20 shown in FIGS. 11 and 12 is laminated from the bottom in order. However, each drawing in FIGS. 11 and 12 shows the state when seen from the lower side (side facing a mounting substrate). Then, what is shown as a dielectric layer 21 is the bottom surface of the dielectric layer 20 (upper surface of the laminate), that is, the electrodes and portions of the part mounting surface are shown. Moreover, the symbols shown in FIGS. 11 and 12 correspond to the symbol of each element shown in FIGS. 9 and 10.

Various external terminal electrodes to be mounted on the mounting substrate are disposed on the lower surface of the lowermost dielectric layer 1. That is, the GSM transmission signal input terminal Tx1, DCS/PCS transmission signal input terminal Tx23, GSM reception signal output terminal Rx1, DCS reception signal output terminal Rx2, PCS reception signal output terminal Rx3, each of control signal input terminals Vc1 and Vc2, drive voltage input terminal Vdd, ground (grounding) terminal GND, and antenna connection terminal ANT are provided. Here, the antenna connection terminal ANT is disposed so as to be away from the GSM transmission signal input terminal Tx1 and the DCS/PCS transmission signal input terminal Tx23. For example, as shown in FIG. 11, when the transmission signal input terminals Tx1 and Tx23 are disposed along a side surface (left side surface when seen from the front of the drawing) of the laminate, the antenna connection terminal ANT is disposed along the side surface (right side surface when seen from the front of the drawing), opposite to the left side surface.

A common ground electrode GND is disposed in the dielectric layer 2, and the common ground electrode GND is also used as the opposite electrodes TCu3b and RCt2b of the capacitors TCu3 and RCt2.

In the dielectric layer 3, the opposite electrodes TCu3a and RCt2a of the capacitors TCu3 and RCt2 are provided.

In the dielectric layer 4, a common ground electrode GND is disposed, and the common ground electrode GND is also used as the opposite electrodes TCu3b, RCt2b, TCu1b, and TCu2b of the capacitors TCu3, RCt2, RCu1, and TCu2.

In the dielectric layer 5, the opposite electrodes TCu1a and TCu2a of the capacitors TCu1 and TCu2 are provided.

In the dielectric layer 6, a common ground electrode GND is disposed, and the common ground is also used as the opposite electrodes TCu1b and TCu2b of the capacitors TCu1 and TCu2.

In the dielectric layers 7 to 12, the inductors TLt2, TLt4, RLt1, and RLt2 are provided; in the dielectric layers 8 to 12, the inductor TLt1 is provided; and in the dielectric layers 8 to 11, the inductor TLt3 is provided.

In the dielectric layer 13, the opposite electrode RCt1b of the capacitors RCt1 is provided.

In the dielectric layer 14, the opposite electrodes RCt1a, TCt2a, and TCt3a of the capacitors RCt1, TCt2, and TCt3 are disposed.

In the dielectric layer 15, the opposite electrodes RCt1b, TCt2b, and TCt3b of the capacitors RCt1, TCt2, and TCt3 are provided. Here, the opposite electrode TCt2b is also used as the opposite electrode TCt1a of the capacitor TCt1.

In the dielectric layer 16, the opposite electrodes RCt1a and TCt1b of the capacitors RCt1 and TCt1 are provided.

In the dielectric layer 17, the opposite electrode RCt1b of the capacitor RCt1 is disposed, and in the dielectric layer 18, the opposite electrode RCt1a of the capacitor RCt1.

In the dielectric layer 19, a wiring pattern is disposed, and, in the dielectric layer 20, a wiring pattern for making the grounding electrode and grounding terminal GND in the lower layer and each grounding electrode and the land for the grounding disposed on the back surface 21 of the dielectric layer 20 as the uppermost layer conductive therebetween is provided.

On the back surface of the uppermost dielectric layer 20, that is, on the upper surface 21 of the laminate, the lands for mounting the GaAsSW are arranged along the side wall of the laminate and, in the center of the land group of the arrangement, a wider grounding electrode layer than the land group is arranged in a substantially square configuration. Here, regarding the arrangement of the land group, the land GND for the grounding, the land RF1 for the RF1 terminal, the land for the grounding, the land RF2 for the RF2 terminal, and the land GND for the grounding are arranged from the top in order along the left side of the dielectric layer 21 in FIG. 4 when the drawing is seen as it is; the land Vdd for the drive voltage Vdd and the land Vc1 for the control signal Vc1 are arranged from the left in order along the lower side; the land Vc2 for the control signal Vc2, the land GND for the grounding, the land ANT for the antenna input-output terminal, the land GND for the grounding, and the land RF3 for the RF3 terminal are arranged from the bottom in order along the right side; and the land GND for the grounding and the land RF4 for the RF4 terminal are arranged from the right in order along the upper side. In this way, the GaAsSW is mounted on the lands arranged as described above.

In this way, the same structure as the high-frequency module shown in the above-described first preferred embodiment can be applied to a high-frequency module for transmitting and receiving a GSM/DCS/PCS communication signal and the same effect can be obtained as in the first preferred embodiment of the present invention.

Moreover, although each of the various preferred embodiments is described as preferably using the GaAsSW, the structure shown in each of the preferred embodiments can be applied to an FET switch in which one particular terminal can be selectively connected to a plurality of the other terminals, and then, the above-described advantages can be obtained.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A high-frequency module for transmitting and receiving transmission-reception signals of communication systems of at least three kinds from an antenna, the signals to be inputted and outputted from particular input-output portions, respectively, the high-frequency module comprising:

an FET switch including an antenna input-output portion to be connected to the antenna and at least three signal input-output portions whose connection to the antenna input-output portion is switched in accordance with control signals to be inputted, the FET being constituted such that the transmission signals of communication systems of three kinds are inputted from different signal input-output portions and such that reception signals of at least two communication systems are outputted from the same signal input-output portion; and a diplexer connected to the signal input-output portion of the FET switch, from which reception signals of at least two communication systems are outputted, the diplexer being arranged to separate the reception signals of the at least two communication systems; wherein the high-frequency module is a high-frequency module arranged to transmit and receive transmission-reception signals of first, second, third, and fourth communication systems from the antenna, and the FET switch includes first, second, third, and fourth signal input-output potions and is constituted such that transmission signals of the first communication system and the second communication system are inputted to the first signal input-output portion, such that transmission signals of the third communication system and the fourth communication system are inputted to the second signal input-output portion, such that reception signals of the first communication system and the fourth communication system are outputted from the third signal input-output portion, and such that reception signals of the second communication system and the third communication system are outputted from the fourth signal input-output portion; and a first diplexer connected to the third signal input-output portion and arranged to separate a reception signal of the first communication system and a reception signal of the fourth communication system and a second diplexer connected to the fourth signal input-output portion and arranged to separate a reception signal of the second communication system and a reception signal of the third communication system are provided.

2. A high-frequency module as claimed in claim 1, wherein the FET switch is an FET switch including GaAs.

3. A high-frequency module as claimed in claim 1, wherein the high-frequency module includes a laminate having dielectric layers laminated therein, and each circuit element constituting the diplexer is made up of an electrode pattern disposed on the surface of the dielectric layer.

4. A high-frequency module as claimed in claim 3, wherein, on an uppermost surface of the laminate, a plurality of lands for mounting an antenna input-output portion and each signal input-output portion of the FET switch are disposed and a grounding electrode is disposed substantially in the center where the plurality of lands are disposed.

5. A high-frequency module as claimed in claim 3, wherein, on a lowermost surface of the laminate, a plurality of electrodes for mounting the laminate on a mounting substrate is disposed, and an electrode of the input-output portion for inputting a transmission signal and an electrode of the antenna input-output portion in the plurality of electrodes are disposed along different sides of the laminate.

6. A high-frequency module as claimed in 3, wherein, on an uppermost surface of the laminate, a plurality of lands for mounting the antenna input-output portion and each of the at least there signal input-output portions of the FET switch are disposed and a grounding electrode is provided inside the laminate at a location corresponding to where the plurality of lands are disposed.

7. A high-frequency module for transmitting and receiving transmission-reception signals of communication systems of at least three kinds from an antenna, the signals to be inputted and outputted from particular input-output portions, respectively, the high-frequency module comprising:

an FET switch including an antenna input-output portion to be connected to the antenna and at least three signal input-output portions whose connection to the antenna input-output portion is switched in accordance with control signals to be inputted, the FET being constituted such that the transmission signals of communication systems of three kinds are inputted from different signal input-output portions and such that reception signals of at least two communication systems are outputted from the same signal input-output portion; and a diplexer connected to the signal input-output portion of the FET switch, from which reception signals of at least two communication systems are outputted, the diplexer being arranged to separate the reception signals of the at least two communication systems; wherein the high-frequency module is a high-frequency module arranged to transmit and receive transmission-reception signals of first, second, third, and fourth communication systems from the antenna, and the FET switch includes first, second, third, and fourth signal input-output portions and is constituted such that a transmission signal of the first communication system and a reception signal of the second communication system are inputted to the first signal input-output portion, such that transmission signals of the second communication system and the third communication system are inputted to the second signal input-output portion, such that a reception signal of the third communication system is outputted from the third signal input-output portion, and such that a reception signal of the first communication system and a transmission-reception signal of the fourth communication system are inputted to and outputted from the fourth signal input-output portion.

8. A high-frequency module as claimed in claim 7, wherein a first diplexer connected to the first signal input-output portion and arranged to separate a transmission signal of the first communication system and a reception signal of the second communication system and a second diplexer connected to the fourth signal input-output portion and arranged to separate a reception signal of the first communication system and a transmission-reception signal of the fourth communication system are included.

9. A high-frequency module as claimed in claim 7, wherein the FET switch is an FET switch including GaAs.

10. A high-frequency module as claimed in claim 7, wherein the high-frequency module includes a laminate having dielectric layers laminated therein, and each circuit element constituting the diplexer is made up of an electrode pattern disposed on the surface of the dielectric layer.

11. A high-frequency module as claimed in claim 10, wherein, on an uppermost surface of the laminate, a plurality of lands for mounting an antenna input-output portion and each signal input-output portion of the FET switch are disposed and a grounding electrode is disposed substantially in the center where the plurality of lands are disposed.

12. A high-frequency module as claimed in claim 10, wherein, on a lowermost surface of the laminate, a plurality of electrodes for mounting the laminate on a mounting substrate is disposed, and an electrode of the input-output portion for inputting a transmission signal and an electrode of the antenna input-output portion in the plurality of electrodes are disposed along different sides of the laminate.

13. A high-frequency module as claimed in 10, wherein, on an uppermost surface of the laminate, a plurality of lands for mounting the antenna input-output portion and each of the at least there signal input-output portions of the FET switch are disposed and a grounding electrode is provided inside the laminate at a location corresponding to where the plurality of lands are disposed.

14. A high-frequency module for transmitting and receiving transmission-reception signals of communication systems of at least three kinds from an antenna, the signals to be inputted and outputted from particular input-output portions, respectively, the high-frequency module comprising:

an FET switch including an antenna input-output portion to be connected to the antenna and at least three signal input-output portions whose connection to the antenna input-output portion is switched in accordance with control signals to be inputted, the FET being constituted such that the transmission signals of communication systems of three kinds are inputted from different signal input-output portions and such that reception signals of at least two communication systems are outputted from the same signal input-output portion; and a diplexer connected to the signal input-output portion of the FET switch, from which reception signals of at least two communication systems are outputted, the diplexer being arranged to separate the reception signals of the at least two communication systems; wherein the high-frequency module is a high-frequency module arranged to transmit and receive transmission-reception signals of first, second, and third communication systems from the antenna, and the FET switch includes first, second third, and fourth signal input-output portions and is constituted such that a transmission signal of the first communication system is inputted to the first signal input-output portion, such that transmission signals of the second communication system and the third communication system are inputted to the second signal input-output portion, such that a reception signal of the third communication system is outputted from the third signal input-output portion, and such that a reception signal of the first communication system and a reception signal of the second communication system are outputted from the fourth signal input-output portion.

15. A high-frequency module as claimed in claim 14, wherein a diplexer is connected to the fourth signal input-output portion and arranged to separate a reception signal of the first communication system and a reception signal of the second communication system.

16. A high-frequency module as claimed in claim 14, wherein the FET switch is an FET switch including GaAs.

17. A high-frequency module as claimed in claim 14, wherein the high-frequency module includes a laminate having dielectric layers laminated therein, and each circuit element constituting the diplexer is made up of an electrode pattern disposed on the surface of the dielectric layer.

18. A high-frequency module as claimed in claim 17, wherein, on an uppermost surface of the laminate, a plurality of lands for mounting an antenna input-output portion and each signal input-output portion of the FET switch are disposed and a grounding electrode is disposed substantially in the center where the plurality of lands are disposed.

19. A high-frequency module as claimed in claim 17, wherein, on a lowermost surface of the laminate, a plurality of electrodes for mounting the laminate on a mounting substrate is disposed, and an electrode of the input-output portion for inputting a transmission signal and an electrode of the antenna input-output portion in the plurality of electrodes are disposed along different sides of the laminate.

20. A high-frequency module as claimed in 17, wherein, on an uppermost surface of the laminate, a plurality of lands for mounting the antenna input-output portion and each of the at least there signal input-output portions of the FET switch are disposed and a grounding electrode is provided inside the laminate at a location corresponding to where the plurality of lands are disposed.

* * * * *